US011983901B2

(12) United States Patent
Takesue

(10) Patent No.: US 11,983,901 B2
(45) Date of Patent: May 14, 2024

(54) IMAGE PROCESSING APPARATUS AND CONTROL METHOD THEREFOR

(71) Applicant: CANON KABUSHIKI KAISHA, Tokyo (JP)

(72) Inventor: Naoya Takesue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 17/882,484

(22) Filed: Aug. 5, 2022

(65) Prior Publication Data
US 2023/0055221 A1 Feb. 23, 2023

(30) Foreign Application Priority Data

Aug. 17, 2021 (JP) ................................ 2021-132948

(51) Int. Cl.
G06T 7/90 (2017.01)
B41J 2/21 (2006.01)
G01J 3/40 (2006.01)
H04N 1/60 (2006.01)
G01J 3/42 (2006.01)

(52) U.S. Cl.
CPC .................. *G06T 7/90* (2017.01); *B41J 2/21* (2013.01); *G01J 3/40* (2013.01); *H04N 1/6008* (2013.01); *G01J 2003/425* (2013.01)

(58) Field of Classification Search
CPC ....... G06T 7/90; B41J 2/21; G01J 3/40; G01J 2003/425; H04N 1/6008
See application file for complete search history.

(56) References Cited

U.S. PATENT DOCUMENTS

| 10,848,643 | B2 | 11/2020 | Takesue et al. ........... H04N 1/54 |
| 2009/0080009 | A1* | 3/2009 | Takahashi ............ H04N 1/6058 |
| | | | 358/1.9 |
| 2011/0032550 | A1* | 2/2011 | Torigoe .................... H04N 1/60 |
| | | | 358/1.9 |
| 2012/0170950 | A1 | 7/2012 | Tomita ............................ 399/39 |

FOREIGN PATENT DOCUMENTS

JP 2012-155309 8/2012

OTHER PUBLICATIONS

U.S. Appl. No. 17/944,696, filed Sep. 14, 2022.

* cited by examiner

*Primary Examiner* — Quang N Vo
(74) *Attorney, Agent, or Firm* — Venable LLP

(57) ABSTRACT

An image processing apparatus comprises: an image forming unit configured to form an image on a recording medium using a plurality of color materials on the basis of first image data showing an image; and an estimating unit configured to estimate a characteristic of each one of the plurality of color materials in a target region on the formed image on the basis of second image data obtained by reading the formed image. The estimating unit selects an estimation processing unit to use from among a plurality of estimation processing units used for different estimation methods on the basis of a combination of the color materials in the target region.

18 Claims, 18 Drawing Sheets

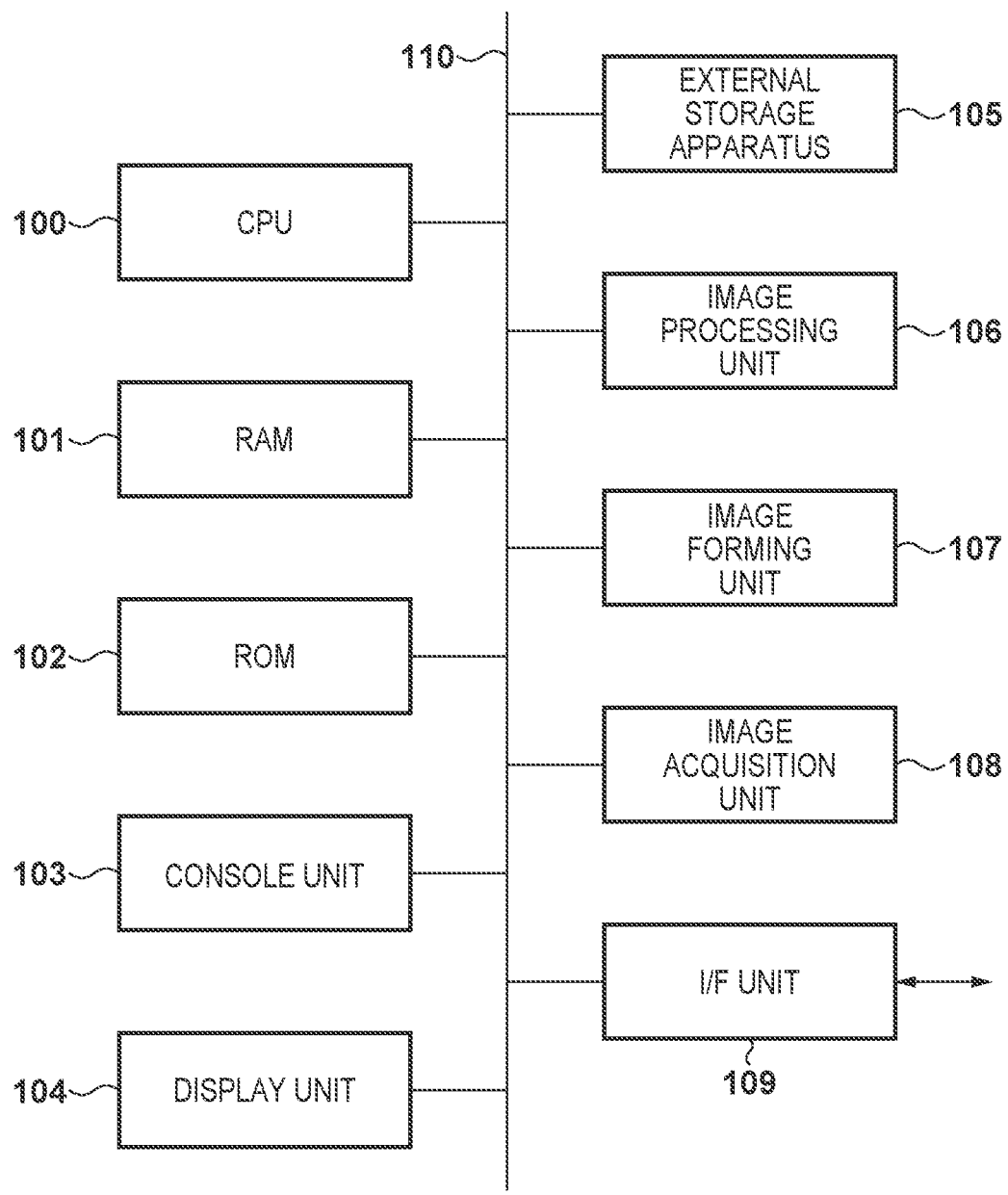

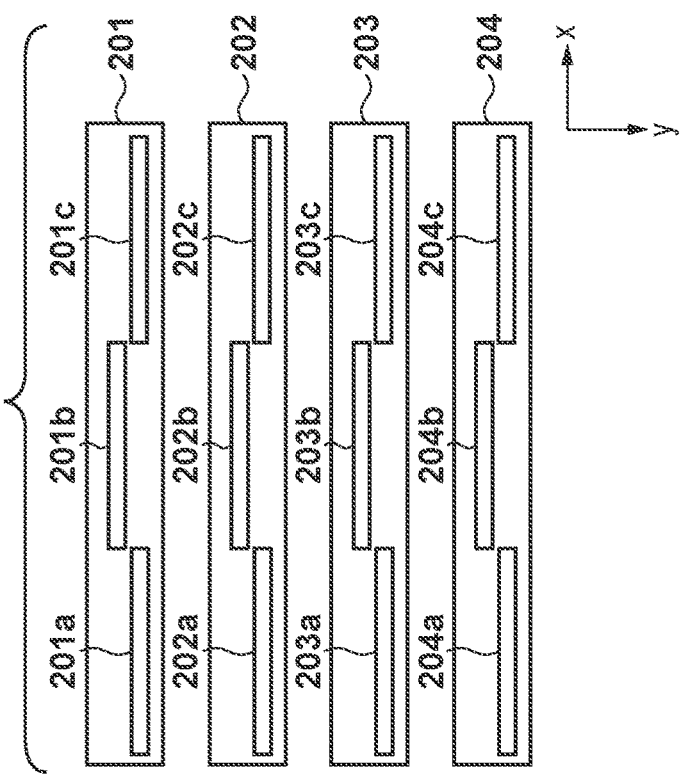
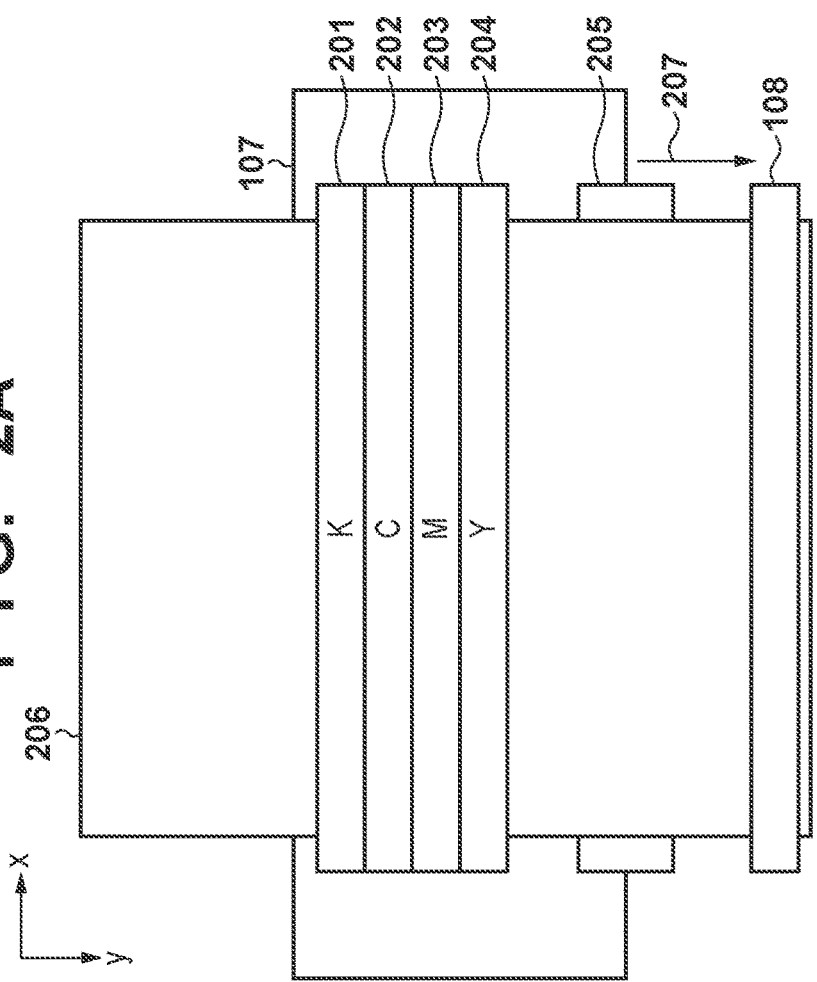
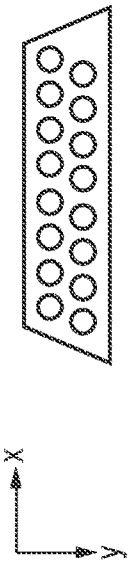
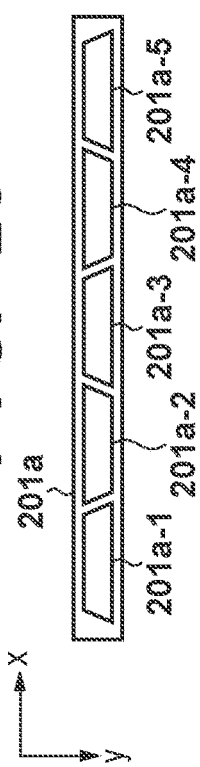

REFLECTIVITY
(NORMALIZED WITH PAPER WHITE)

REFLECTIVITY
(NORMALIZED WITH PAPER WHITE)

REFLECTIVITY
(NORMALIZED WITH PAPER WHITE)

REFLECTIVITY
(NORMALIZED WITH PAPER WHITE)

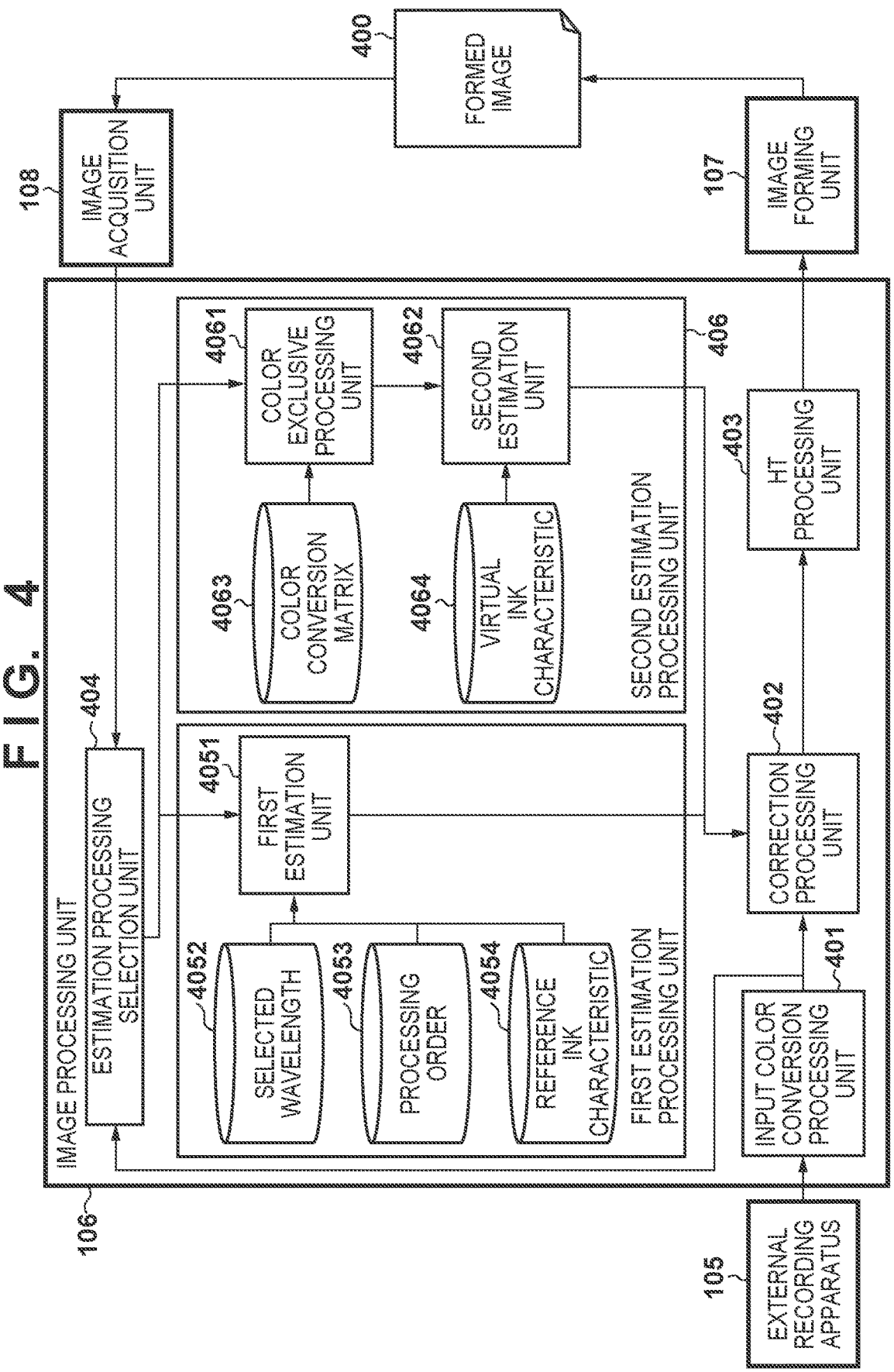

F I G. 5

| | | RECORDING HEAD 201 | | | RECORDING HEAD 202 | | | RECORDING HEAD 203 | | | RECORDING HEAD 204 | | |
|---|---|---|---|---|---|---|---|---|---|---|---|---|---|
| | | 201a | 201b | 201c | 202a | 202b | 202c | 203a | 203b | 203c | 204a | 204b | 204c |
| INPUT COLOR SIGNAL | 0 | 0 | 0 | 0 | 0 | 0 | 0 | 0 | 0 | 0 | 0 | 0 | 0 |
| | 16 | 14 | 16 | 20 | 15 | 16 | 12 | 10 | 16 | 13 | 22 | 16 | 15 |
| | 32 | 28 | 32 | 39 | 31 | 32 | 25 | 20 | 32 | 26 | 46 | 32 | 30 |
| | : | : | : | : | : | : | : | : | : | : | : | : | : |
| | 240 | 221 | 240 | 255 | 238 | 240 | 185 | 148 | 240 | 197 | 255 | 240 | 232 |
| | 255 | 236 | 255 | 255 | 250 | 255 | 202 | 159 | 255 | 211 | 255 | 255 | 252 |

FIG. 7A

| | 380-430 | 430-480 | 480-530 | 530-580 | 630-680 | 680-730 |
|---|---|---|---|---|---|---|
| C | × | ○ | ○ | × | × | × |
| M | × | × | × | × | ○ | ○ |
| Y | × | × | ○ | ○ | ○ | ○ |
| K | × | × | × | × | × | × |

FIG. 7B

| | |
|---|---|
| C | ○ |
| M | ○ |
| Y | ○ |
| K | ○ |
| CM | ○ |
| CY | ○ |
| CK | ○ |
| MY | ○ |
| MK | ○ |
| YK | ○ |
| CMY | ○ |
| CMK | × |
| CYK | ○ |
| MYK | ○ |
| CMKY | × |

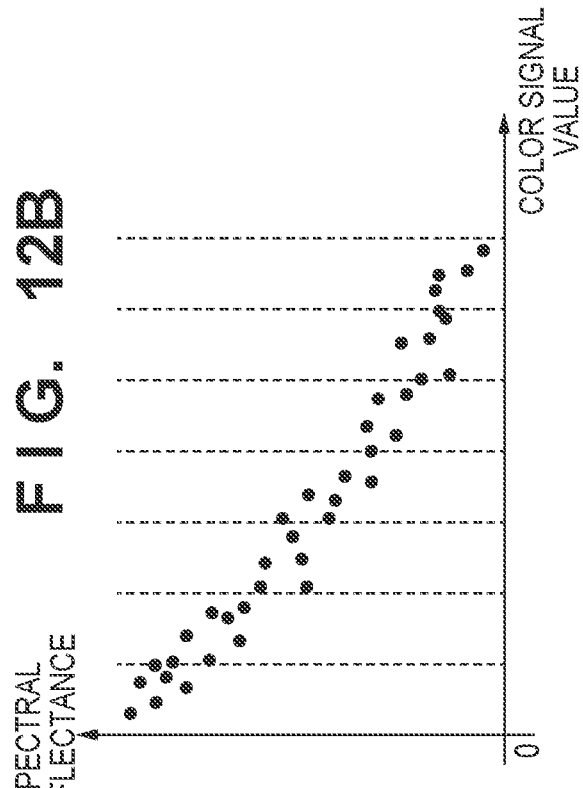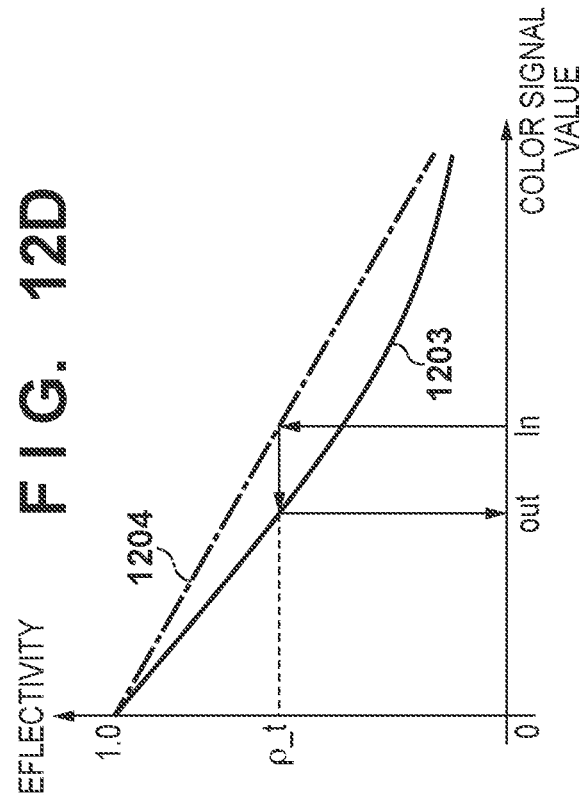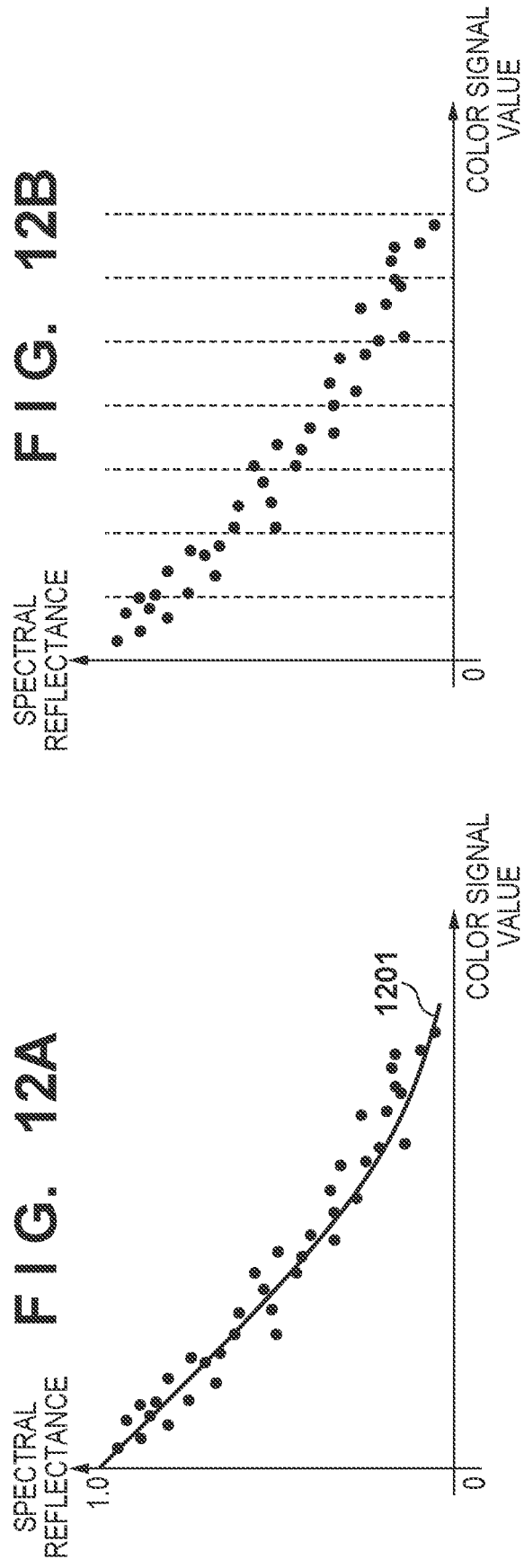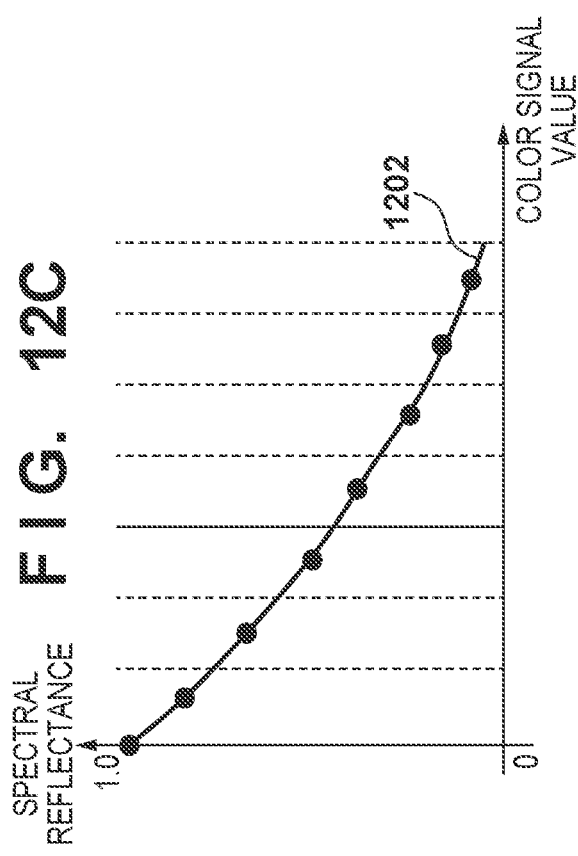

F I G. 16

| PRINTING AMOUNT | ρ_c | ρ_m | ρ_y |
|---|---|---|---|
| 0 | 1.00 | 1.00 | 1.00 |
| 6 | 0.75 | 0.84 | 0.94 |
| 13 | 0.57 | 0.62 | 0.74 |
| ⋮ | ⋮ | ⋮ | ⋮ |
| 94 | 0.13 | 0.16 | 0.18 |
| 100 | 0.13 | 0.15 | 0.17 |

IMAGE PROCESSING APPARATUS AND CONTROL METHOD THEREFOR

BACKGROUND OF THE INVENTION

Field of the Invention

The present invention relates to an image processing apparatus and an image forming apparatus.

Description of the Related Art

As an image forming apparatus for forming a discretionary image on a sheet surface, an inkjet printer that forms an image by discharging ink from a plurality of nozzles is widely used. Also, a printer that uses electrophotography to form an image using a laser photosensitive member and a charging toner is also widely used.

However, with electrophotography, the tint of the formed image changes (non-uniformity is produced) depending on the remaining amount of toner in the apparatus and the environment, such as the surrounding temperature and humidity. With the inkjet method also, the tint changes depending on ink adhesion at the nozzle region, aging of the piezo element and heater for controlling ink discharge, the surrounding environment such as the temperature and humidity, and the like. Thus, a technique for suppressing a change in the tint is used, the technique including executing a stabilization process at constant time intervals.

In the stabilization process, in many cases, a dedicated chart is output for measuring the characteristics of the recording material, such as each color of toner or ink. However, using recording material, sheets, and the time for outputting a dedicated chart leads to an increase in cost. In Japanese Patent Laid-Open No. 2012-155309 (Patent Document 1), a technology is described that maintains the accuracy of stabilization while avoiding an increase in cost by performing the stabilization process on the basis of an output user image.

According to Patent Document 1, in the stabilization process, in order to stabilize the color of an output image, the apparent recording amount of each toner is investigated and estimated from the result of measuring a multi-order color toner image and the image forming condition of each toner is changed. However, depending on the mixed colors and types thereof, the accuracy of the estimation may be reduced. The accuracy of the estimation particularly tends to be reduced when the same process is performed on a region including black ink and a region not including black ink.

SUMMARY OF THE INVENTION

According to one aspect of the present invention, an image processing apparatus comprises: an image forming unit configured to form an image on a recording medium using a plurality of color materials on the basis of first image data showing an image; and an estimating unit configured to estimate a characteristic of each one of the plurality of color materials in a target region on the formed image on the basis of second image data obtained by reading the formed image, wherein the estimating unit selects an estimation processing unit to use from among a plurality of estimation processing units on the basis of a combination of the color materials in the target region.

The present invention can improve the estimation accuracy and processing speed of a stabilization process.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating the hardware configuration of an image forming system.

FIGS. 2A to 2D are schematic diagrams of an image forming unit and an image acquisition unit.

FIG. 4 is a diagram illustrating the functional configuration of an image processing unit according to a first embodiment.

FIG. 5 is a diagram illustrating an example of a correction table.

FIGS. 7A and 7B are diagrams illustrating examples of exclusivity tables.

FIGS. 12A to 12D are diagrams for describing correction table update processing (step S608).

FIG. 16 is a diagram illustrating an example of a table indicating the relationship between the printing amount of an ink and the reflectivity.

DESCRIPTION OF THE EMBODIMENTS

Figure 3A:
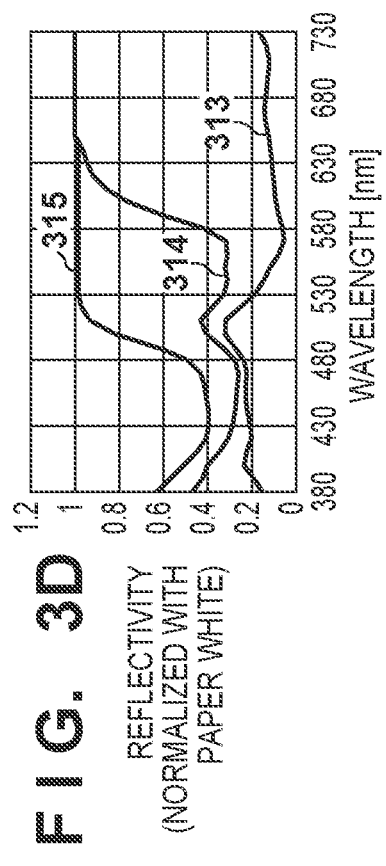
FIGS. 3A to 3J are diagrams illustrating examples of spectral reflectance characteristics.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The first embodiment of an image processing apparatus according to the present invention will be described below using an inkjet printer as an example.

System Configuration

FIG. 1 is a diagram illustrating the hardware configuration of an image forming system according to the first embodiment. The image forming system is provided with a central processing unit (CPU) 100, a random access memory (RAM) 101, a read only memory (ROM) 102, a console unit 103, a display unit 104, an external storage apparatus 105, an image processing unit 106, an image forming unit 107, an image acquisition unit 108, an interface (I/F) unit 109, and a bus 110.

The CPU 100 uses input data and/or a computer program stored in the RAM and/or ROM described below to control the operations of the entire image forming system. Note that in the example described herein, the CPU 100 controls entire image forming system. However, the entire image forming system may be controlled by a plurality of pieces of hardware sharing the processing.

The RAM 101 includes a storage area for temporarily storing computer programs and data read from the external storage apparatus 105 and data received from outside via the I/F unit 109. Also, the RAM 101 is used as a storage area used when the CPU 100 executes various types of processing and as a storage area used when the image processing unit 106 executes image processing. The ROM 102 includes a storage area for storing setting parameters set for each unit in the image forming system, a boot program, and the like.

The console unit 103 is an input apparatus such as a mouse and keyboard or the like and receives operator controls (instructions). In other words, the console unit 103 is used by the operator to input various types of instructions to the CPU 100. The display unit 104 is a display apparatus, such as a cathode ray tube (CRT), liquid crystal screen, or the like, and is capable of displaying processing results from the CPU 100, images, characters, and the like. Note that in a case in which the display unit 104 is a touch panel capable of detecting touch controls, the display unit 104 may function as a portion of the console unit 103.

The external storage apparatus 105 is a large capacity information storage apparatus represented by a hard disk drive. The external storage apparatus 105 stores an operating system (OS), computer programs for the CPU 100 to execute various types of processing, data, and the like. Also, the external storage apparatus 105 holds temporary data (for example, input/output image data, a threshold matrix used by the image processing unit 106, and the like) generated by the processing of the units. The computer programs and data stored in the external storage apparatus 105 are read as appropriate in accordance with control by the CPU 100, are stored in the RAM 101, and are the targets of processing by the CPU 100.

The image processing unit 106 is implemented by a processor or a dedicated image processing circuit capable of executing a computer program. The image processing unit 106 executes various types of image processing for converting image data input as a print target to image data able to be output by an image forming apparatus described below. Also, in the present embodiment, a color stabilization process is executed on the basis of a reading result of a user image described below. Note that instead of preparing a dedicated processor as the image processing unit 106, the CPU 100 can be configured to execute various types of image processing as the image processing unit 106.

The image forming unit 107 uses recording material to form an image on a recording medium on the basis of image data received directly from the image processing unit 106 or via the RAM or external recording apparatus. Note that in the present embodiment, for example, the image forming unit 107 uses four types of recording material (also referred to as color material), cyan (C), magenta (M), yellow (Y), and black (K). Note that other color materials, such as light cyan (LC), light magenta (LM), light gray (LG), and the like may also be used.

The image acquisition unit 108 includes an image sensor (line sensor or area sensor), which is a reading unit for capturing an image of the recorded image formed on the recording medium by the image forming unit 107. Note that in the present embodiment, the image sensor is a spectroscopic sensor capable of acquiring the reflectivity for each wavelength.

The OF unit 109 functions as an interface for connecting the image forming system and external devices. Also, the I/F unit 109 functions as an interface with a communication apparatus for sending and receiving data and as an interface for connecting to the Internet using infrared communication or wireless local area network (LAN). In this manner, the I/F unit 109 is capable of sending and receiving data such as input images to and from external devices.

Note that each unit described above is connected to the bus 110 and is capable of sending and receiving data via the bus 110. However, the image forming system may have a configuration in which the units (for example, the image forming unit 107) described above are connected via the I/F unit 109.

FIGS. 2A to 2D are schematic diagrams of the image forming unit 107 and the image acquisition unit 108. Note that hereinafter, the image forming unit 107 of the present embodiment is an inkjet printer that forms an image by discharging ink from nozzles onto a recording medium.

As illustrated in FIG. 2A, the image forming unit 107 is provided with recording heads 201 to 204 on a frame that forms the structural member of the printer. The recording heads 201 to 204 are each full line types with a plurality of nozzles for discharging a plurality of ink, black (K), cyan (C), magenta (M), and yellow (Y) arranged in a predetermined direction within an area corresponding to the width of a recording sheet 206.

Also, as illustrated in FIG. 2B, the recording heads 201 to 204 are configured as a combination of a plurality of head modules. Head modules 201a, 201b, 201c constituting the recording head 201 are disposed at different positions in the sheet conveyance direction. Also, as illustrated in FIG. 2C, the head module 201a is constituted by chip modules 201a-1 to 201a-5. Here, each chip module is connected to its own independent base.

FIG. 2D is a view of any one of the chip modules from the sheet surface side illustrating the chip module including a plurality of nozzles. In the example illustrated in FIG. 2D, the chip module includes 16 nozzles. Note that the nozzle arrangement of the nozzle rows of each ink color is configured so that the resolution is 1200 dpi, for example.

The recording sheet 206, i.e., the recording medium, is conveyed in the direction indicated by arrow 207 by a conveyance roller 205 (and other not illustrated rollers) being rotated by the drive power of a motor (not illustrated). Then, while the recording sheet 206 is being conveyed, ink is discharged from the plurality of nozzles of the recording heads 201 to 204 in accordance with the recording data to sequentially form images of one raster corresponding to the nozzle row of each recording head. By repeating the operation of discharging ink from the recording heads onto the recording sheet being conveyed, an image on one page can be recorded.

Also, as illustrated in FIG. 2A, the image acquisition unit 108 is a line sensor installed downstream from the recording heads 201 to 204 that covers the entire surface of the recording sheet. The image acquisition unit 108, in parallel with image formation by the recording heads 201 to 204, sequentially acquires spectroscopic information of the recording sheet being conveyed and stores this in the external storage apparatus 105 as two-dimensional spectroscopic image data.

Note that hereinafter, the resolution in the wavelength ($\lambda$) direction of the image acquisition unit 108 is 10 (nm).

Note that the image forming unit 107 is not limited to the full line type illustrated in FIG. 2A. For example, a serial type recording apparatus may be used with recording heads that scan and record in a direction that intersects the conveyance direction of the recording sheet. Also, for example, an electrophotographic type may be used that forms images using a laser photosensitive member and a charging toner, and a thermal-transfer type may be used that vaporizes solid ink using heat to transfer the ink onto the printing paper.

The image acquisition unit 108 also is not limited to the line sensor illustrated in FIG. 2A. In an example of another configuration, a carriage for moving in a direction that intersects with the conveyance direction of the recording sheet is provided and a discretionary region of a width less than the recording sheet 206 is acquired.

Summary of Stabilization Process

It is known that the density of an image formed on a sheet surface changes even when the same image is formed using the recording heads due to ink adhesion at the nozzle region, aging of the piezo element and heater for controlling ink discharge, the surrounding environment such as the temperature and humidity, and the like. Such a change in the density of an image visually appears as density non-uniformity or color transition and may negatively affect the quality of the image. Thus, such a change in density is preferably suppressed as much as possible.

As illustrated in FIG. 2A, in the image forming system, the image formed by the recording heads 201 to 204 can be read by the line sensor installed downstream. In other words, a change in density such as that described above can be suppressed by estimating the change in density from two-dimensional image data acquired by the line sensor and a performing a color stabilization process.

Here in the stabilization process, using a dedicated chart results in costs in terms of sheets, recording material, time, and the like. Thus, instead of using a dedicated chart, it is preferable to estimate from a read image of a user image (an image discretionarily formed and output by a user). In other words, the image forming apparatus of the present embodiment as illustrated in FIG. 2A forms a discretionary image by mixing the four recording material CMYK colors. Change in density due to change over time independently occurs for each CMYK color. Accordingly, change in density can be effectively decreased by performing gamma correction processing independently for each color on the pixel values and/or ink recording amount (printing amount) corresponding to each color.

However, a region where each color is formed as a single color does not always exist in the user image. In such cases, it is necessary to estimate the change in density of each recording material by reading multi-color regions where colors are mixed. Accordingly, desirably, the change in density per nozzle is estimated, and gamma correction processing needs to be performed. However, depending on the processing load as described below, instead of per nozzle, the perform may be performed per chip module or per head module.

In this case, the change in density of each recording material often changes per head module or per chip module as described above. Furthermore, even in the same module, the amount of change between each nozzle is often different. In order to estimate per module or per nozzle, the change in density needs to be estimated per the unit to be corrected and the gamma correction processing needs to be performed.

For example, in a case in which the recording heads 201 to 204 are independently corrected, the processing requires that the change in density is estimated four times (for C, M, Y, and K). Alternatively, in the case of performing the processing per head module, in order to independently correct the three modules of each color as illustrated in FIG. 2B, the estimation processing needs to be performed twelve times, i.e., four colors×three head modules. In a similar manner, in the case of performing the processing per chip module as illustrated in FIG. 2C, because there are five chip modules, the estimation processing needs to be performed 60 times, and in the case of performing the processing per nozzle, the estimation processing needs to be performed 960 times, as there are 16 nozzles per chip module. Accordingly, as the unit for correction gets smaller, the number of times the estimation processing is performed increases. In order to maintain the same print speed but also performed correction per small units, high-speed estimation processing is required.

First Estimation Processing (Method Using Wavelengths Able to be Exclusively Estimated and Estimation Order)

In the present embodiment, high-speed estimation is performed by taking into account the degree of exclusivity each color material has in terms of wavelength space and deciding the wavelength to be used in estimation and the estimation order. A summary of the estimation processing of the present embodiment will be described below using FIGS. 3A to 3J.

FIGS. 3A to 3J are diagrams illustrating examples of spectral reflectance characteristics. FIG. 3A illustrates the spectral reflectance characteristic $\rho c(kc, \lambda)$ of C ink discharged by the recording head 202. Note that $\lambda$ is the wavelength (nm), and kc is the printing amount (%) of the C ink. Here, printing amount represents the proportion of dots on a grid are discharged using a nozzle resolution of 1200 dpi, for example, where a case in which the printing amount kc is 100% indicates that C ink is discharged at all grid points.

A curved line 301 is a curved line indicating the spectral reflectance $\rho c(100, \lambda)$ in a case in which the C ink is discharged with a 100% printing amount. Note that hereinafter, the reflectivity normalized by the spectral reflectance of the paper is used as the spectral reflectance of each ink. In a similar manner, a curved line 302 indicates $\rho c(50, \lambda)$, a curved line 303 indicates $\rho c(25, \lambda)$, and a curved line 304 indicates $\rho c(0, \lambda)$. Note that as described above, because normalization is performed using the spectral reflectance of the paper, the spectral reflectance $\rho c(0, \lambda)$ has a reflectivity across the whole wavelength range of 1.0.

In a similar manner, curved lines 305 to 308 each indicate the spectral reflectance characteristic $\rho m(km, \lambda)$ in a case in which the M ink is discharged with a 100%, 50%, 25%, and 0% printing amount, respectively. Also, curved lines 309 to 312 indicate the spectral reflectance characteristic $\rho y(ky, \lambda)$ of the Y ink.

Figure 3B:
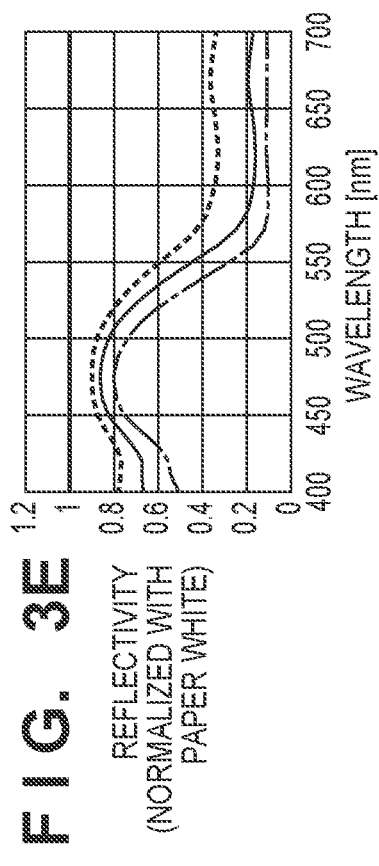
Figure 3C:
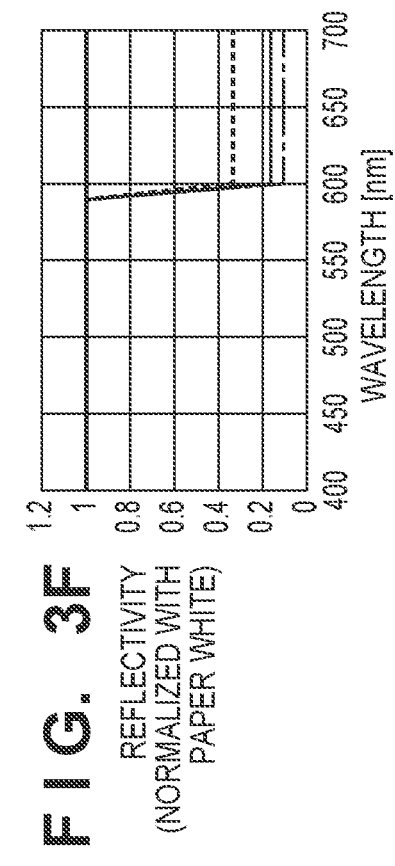
Figure 3D:
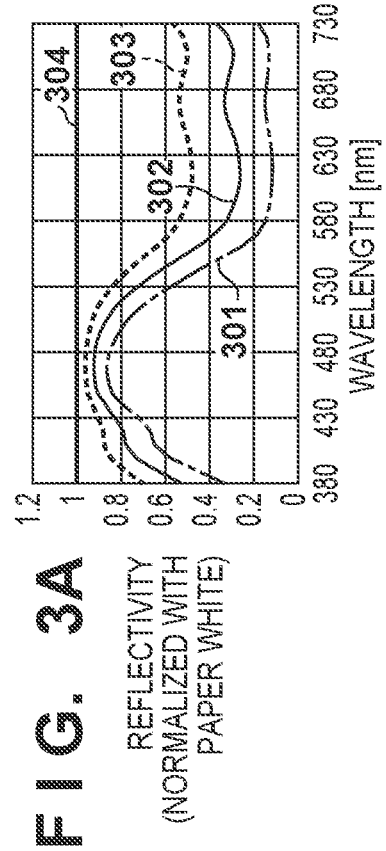
Figure 3E:
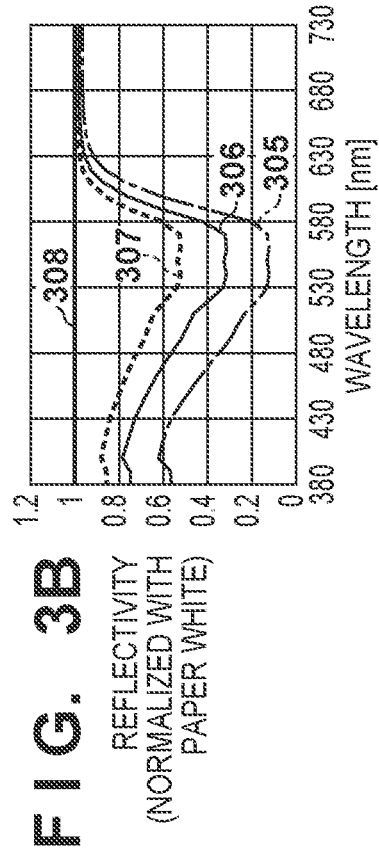

Next, estimating the spectral reflectance of each recording material, C, M, and Y, from the spectral reflectance of a CMY mixed region will be discussed. More specifically, the printing amount kc (%) of the C ink, the printing amount km (%) of the M ink, and the printing amount ky (%) of the Y ink that satisfy Mathematical Formula (1) below are estimated. Note that ρx(λ) in Mathematical Formula (1) is the spectral reflectance of the CMY mixed region used in estimation. Also, the spectral reflectance ρc(kc, λ), ρm(km, λ), ρy(ky, λ) of the inks indicated in FIGS. 3A to 3C have been acquired in advance prior to estimation.

$$\rho x(\lambda) = \rho c(kc,\lambda) \times \rho m(km,\lambda) \times \rho y(ky,\lambda) \qquad (1)$$

ρx(λ) is acquired as indicated by a curved line 313 (FIG. 3D). Here, by focusing on the spectral reflectance characteristic (characteristic of each wavelength band when divided into a plurality of wavelength bands) of the C, M, and Y recording materials indicated in FIGS. 3A to 3C, it can be seen that in the wavelength range of 630 nm or greater, the reflectivity of M and Y is close to 1.0. In other words, only the C ink has sensitivity toward wavelengths of 630 nm or greater.

Thus, in a case in which k is 650 and the reflectivity of M and Y is 1.0, ρx(650)=ρc(kc, 650) holds true. Then, kc can be estimated from this relationship. Here, the relationship between ρc(kc, 650) and kc is one that monotonically decreases as indicated in FIG. 3A, and, using this relationship, kc that satisfies Mathematical Formula (1) can be easily and quickly calculated.

Following on from estimating kc, estimating km will be discussed. For example, it is assumed that, following from that described above, kc is estimated to be 90%. Here, the spectral reflectance characteristic ρx'(X) with the effects of the C ink removed from the spectral reflectance characteristic ρx(X) can be calculated via ρx'(X)=ρx(X)/ρc(90, λ). A curved line 314 (FIG. 3D) is a curved line indicating the spectral reflectance ρx'(X) obtained in this manner, for example.

However, as can be seen from the spectral reflectance characteristic of the M ink and the Y ink indicated in FIGS. 3B and 3C, in the wavelength band at or near 550 nm, only the M ink has sensitivity. Here, as ρx'(550)=ρm(km, 550), km that satisfies Mathematical Formula (1) can be uniquely calculated from the monotonically increasing relationship. Furthermore, by using km obtained in this manner, the spectral reflectance characteristic ρx"(λ) with the effects of the M ink removed from the spectral reflectance ρx'(λ) can be calculated via ρx"(λ)=ρx'(λ)/ρm(km, λ).

A curved line 315 (FIG. 3D) indicates ρx"(λ), for example. Here, because the effects of C and M have been removed from the CMY mixed region, it can be considered that the spectral reflectance ρx"(λ)=ρy(ky, λ). For example, in a case in which λ=450 nm, ky that satisfies Mathematical Formula (1) can be uniquely calculated from the monotonically increasing relationship.

In this manner, as described above, by using wavelengths able to be exclusively estimated and an estimation order, the printing amount kc, km, ky of each ink and the spectral reflectance ρc, ρm, ρy that satisfy Mathematical Formula (1) can be easily and quickly estimated.

The spectral reflectance corresponding to each module can be obtained by performing the estimation processing described above for each head module, for example. Also, a gamma correction table can be created to make the reflectivity roughly equal using a module or a wavelength as a reference on the basis of the obtained spectral reflectance. A correction table obtained in this manner can be applied to an input image to suppress in-surface non-uniformity due to change over time. Note that, even when creating a gamma correction table, by using the monotonically decreasing relationship described above, a correction value for making it roughly the same as a reference module can be easily obtained.

Second Estimation Processing (Method Using Matrix for Converting to Virtual Ink)

However, in some cases, two or more inks for which a wavelength for which reflectivity can be uniquely determined does not exist are used in combination. An example of such a case includes a case in which two or more inks have sensitivity in all of the wavelength bands. For example, in a combination of the C ink with the spectral reflectance characteristic indicated in FIG. 3E and the M ink with the spectral reflectance characteristic indicated in FIG. 3G, there are no wavelength bands where the reflectivity of the inks can be considered to be roughly 1.0. In such a case, in the C and M mixed region, the reflectivity at any wavelength band is approximated to 1.0, and, by exclusively deducing the reflectivity of each ink, an error caused by the approximation may instead cause density non-uniformity.

Figure 3F:
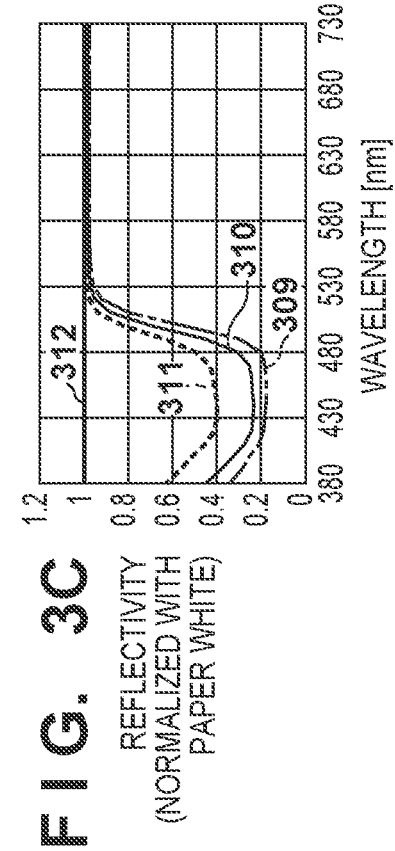
Figure 3G:
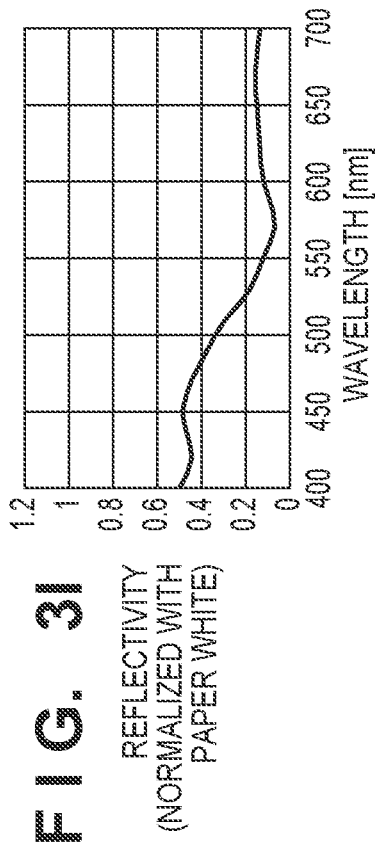
Figure 3I:
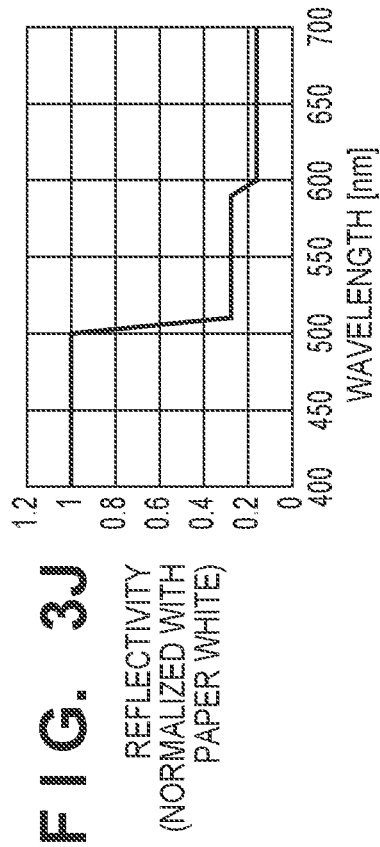
Figure 3H:
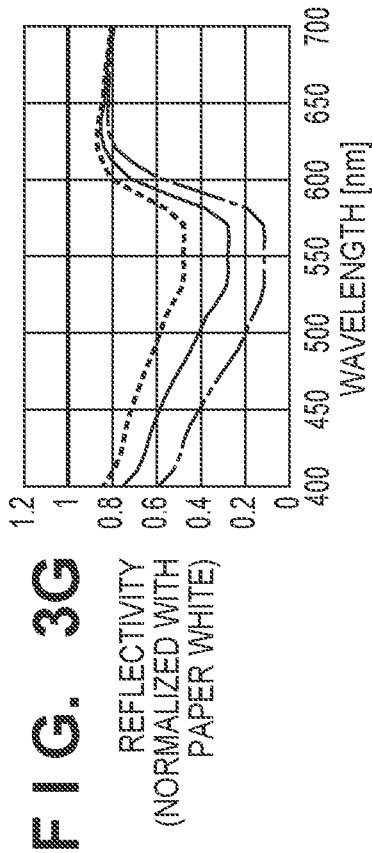

However, by estimating the reflectivity of each ink without using approximation, it is necessary to perform estimation at the same time as taking into account the spectral reflection characteristic of each ink, and thus time is needed for calculation. Regarding this, in the first embodiment, a virtual C ink with sensitivity only in a predetermined wavelength band indicated in FIG. 3F is set. In a similar manner, a virtual M ink with sensitivity only in a wavelength band different from the virtual C ink indicated in FIG. 3H is set. Also, a conversion matrix is calculated for converting (performing a matrix operation) simultaneously the spectral reflection characteristic of the C ink to the spectral reflection characteristic of the virtual C ink and the spectral reflection characteristic of the M ink to the spectral reflection characteristic of the virtual M ink.

Figure 3J:
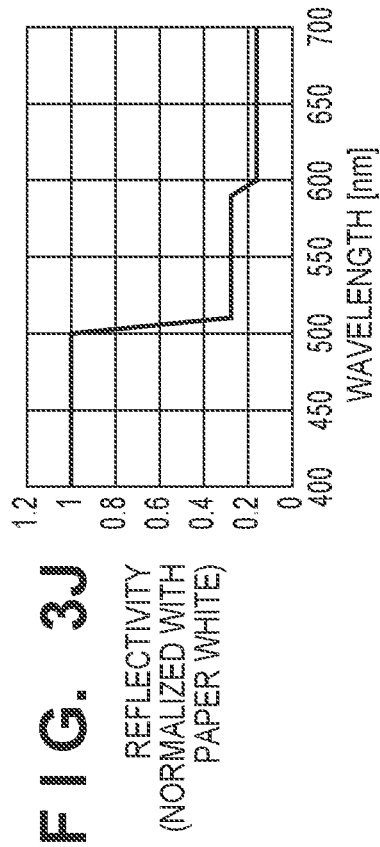

Furthermore, using the conversion matrix obtained in this manner, the reflectivity of each recording material can be quickly calculated from the mixed color region. An example of the spectral reflectance of the mixed region including the C ink and the M ink obtained in this manner is indicated in FIG. 3I. Then, by performing conversion using the conversion matrix described above on the spectral reflectance of the mixed region, the spectral reflectance indicated in FIG. 3J is obtained. Here, the spectral reflectance indicated in FIG. 3J is a mix of the virtual C ink and the virtual M ink having exclusive wavelength bands. Thus, looking at the reflectivity at 550 nm and 600 nm, for example, as described above, the reflectivity of each ink can be uniquely calculated from the monotonically increasing relationship.

Thereafter, by correcting the C ink and the M ink on the basis of the obtained virtual C ink and virtual M ink, the ink from the mixed region can be quickly corrected. Note that when the conversion processing using a matrix is performed, the estimation processing can be performed without relying on the ink combination. However, processing needs more time compared to a case in which wavelengths able to be exclusively estimated and an estimation order are used as described above.

Here, in the first embodiment, depending on the degree of exclusivity of the ink included in the target region on the image, the method using wavelengths able to be exclusively estimated and an estimation order and the method using a matrix for converting to virtual ink are selectively used. By selectively using the methods, the region used in estimation can be enlarged while an increase in the processing time can be kept to a minimum.

Functional Configuration of Image Processing Unit 106

FIG. 4 is a diagram illustrating the functional configuration of the image processing unit according to the first embodiment. The image processing unit 106 is a functional unit that performs the stabilization process described above. The image processing unit 106 is constituted by an input color conversion processing unit 401, a correction processing unit 402, a halftone (HT) processing unit 403, an estimation processing selection unit 404, a first estimation processing unit 405, and a second estimation processing unit 406.

The first estimation processing unit 405 is constituted by a first estimation unit 4051, a selection wavelength 4052, a processing order 4053, and a reference ink characteristic 4054. The first estimation processing unit 405 estimates the reflectivity of each ink using a wavelength able to be exclusively estimated and an estimation order. The second estimation processing unit 406 is constituted by a color exclusive processing unit 4061, a second estimation unit 4062, a color conversion matrix 4063, and a virtual ink characteristic 4064. The second estimation processing unit 406 estimates the reflectivity of each ink using a matrix for converting to a virtual ink.

The input color conversion processing unit 401 converts the input image data from the external storage apparatus 105 to image data corresponding the color reproduction range of the printer. The input image data is data indicating the color coordinates (R, G, B) from among the color space coordinates of sRGB or the like, which are the colors portrayed on the monitor. The input color conversion processing unit 401 executes processing to convert the data to color signals corresponding the plurality of inks used by the image forming unit 107. For example, in a case in which the image forming unit 107 uses black (K), cyan (C), magenta (M), and yellow (Y), the image data of the RGB signal is converted into image data including 8-bit color signals for K, C, M, and Y. For this conversion, a known method, such as matrix conversion processing, processing using a 3D lookup table (LUT), and the like may be used.

Note that the input data is not limited to data indicating RGB and may be data directly indicating CMYK. However, in such a case, to limit the total amount of ink and for color management, at the input color conversion processing unit 401, processing using a 4D LUT for converting CMYK to C'M'Y'K' is preferably executed.

At the correction processing unit 402, correction processing for stabilizing color with respect to change over time is executed. Specifically, using a correction table (not illustrated) calculated for each module or nozzle, gamma correction processing is applied to each piece of CMYK image data.

FIG. 5 is a diagram illustrating an example of a correction table. The correction table stores post-correction color signal values corresponding to each color signal for the recording heads 201 to 204. For example, among the K color signal image data, if the input color signal value of a pixel corresponding to the recording head 201 is 32, the correction processing unit 402 changes the pixel value of the pixel to 28. In the present embodiment, regarding to the CMYK color signals, correction processing is executed by referencing the conversion table of the corresponding head module. In a case in which the correction processing is executed per chip module or nozzle, instead of per the head module, a correction table 407 is provided with a number of columns equal to the number of chip modules or nozzles.

Note that in the correction table of FIG. 5, regarding input color signal values that don't exist in the LUT, interpolation processing is used to calculate the color signal from a similar signal value stored in the LUT. Naturally, post-conversion color signal values of all color signal values may be stored without using interpolation processing. Alternatively, correction processing may be executed using function transformation or matrix transformation instead of a correction table.

The HT processing unit 403 executes HT processing to convert the post-correction color signal image data to the tones able to be portrayed by the image forming unit 107 and creates halftone image data. Specifically, image data with each pixel being represented by 8 bits is converted to a 1 bit binary halftone image data with each pixel having a value of 0 or 1. A known method, such as error diffusion processing and dither processing may be applied to HT processing.

The estimation processing selection unit 404 assigns the spectral reflectance $\rho x(x, y, \lambda)$ obtained from the image acquisition unit 108 to either the first estimation processing unit 405 or the second estimation processing unit 406 on the basis of the image data (CMYK) acquired by the input color conversion processing unit 401. This processing will be described below in detail with reference FIGS. 6 and 8.

On the basis of the spectral reflectance $\rho x(x, y, \lambda)$ corresponding to the pixel positions (x, y) assigned by the estimation processing selection unit 404, the first estimation processing unit 405 and the second estimation processing unit 406 estimate the reflectivity $\rho c$, $\rho m$, $\rho y$ of each ink at the positions. Note that the estimation processing at the first estimation processing unit 405 and the second estimation processing unit 406 will be described below in detail with reference to FIGS. 9 and 11A to 11C.

System Operation

Figure 6:
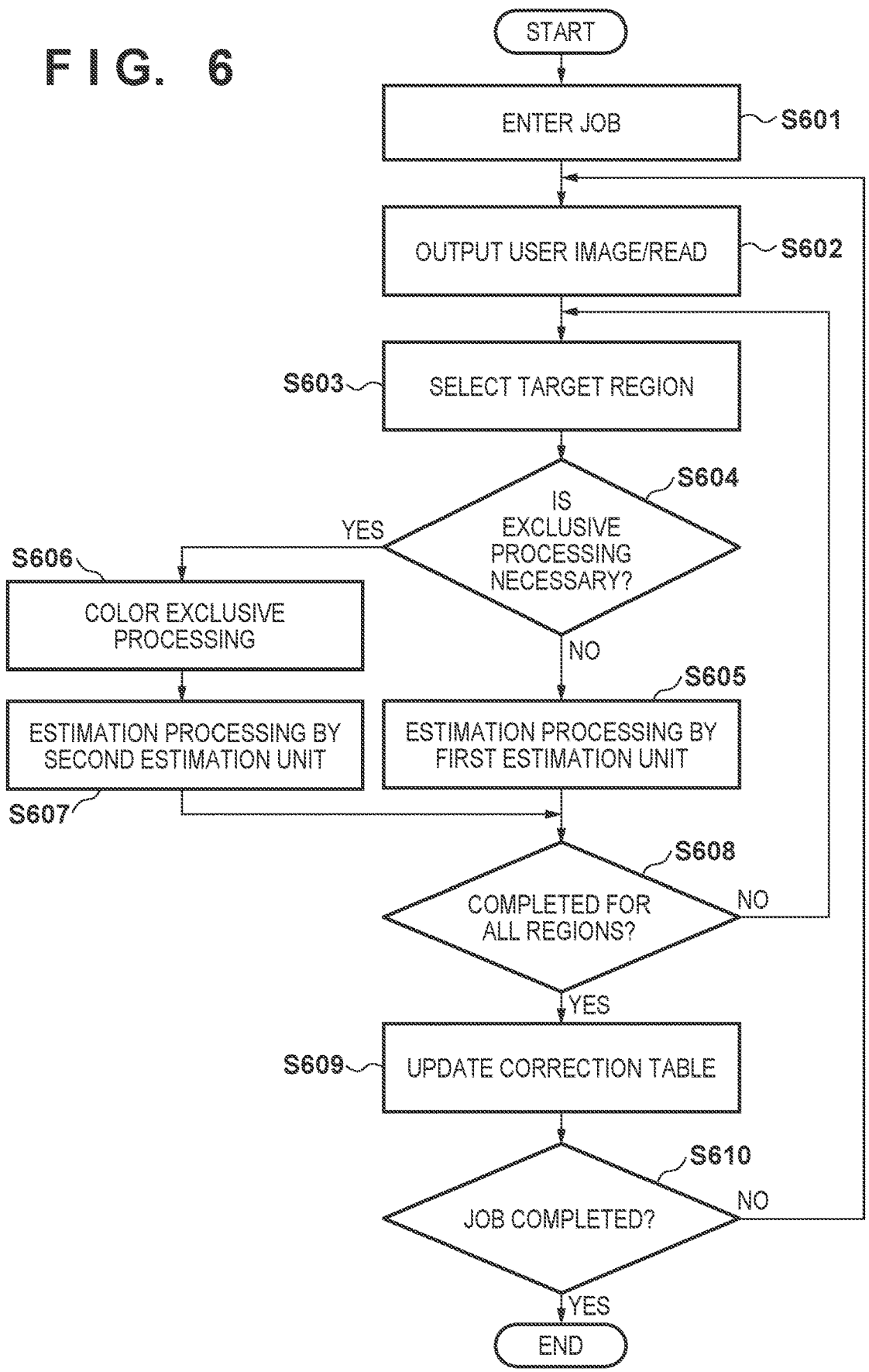
FIG. 6 is a flowchart of a correction process according to the first embodiment.

FIG. 6 is a flowchart of the correction processing according to the first embodiment. In step S601, via the console unit 103, the user enters a print job to the image forming apparatus. Specifically, the user specifies the output image file and the number of sheets to output inside the external storage apparatus.

In step S602, the image processing unit 106, on the basis of the acquire print job, forms the image via the image forming unit 107 and reads the formed image via the image acquisition unit 108. More specifically, first, the image processing unit 106 acquires an image stored in the external storage apparatus 105 in advance under the specified file name. Then, the acquired image is sent to the input color conversion processing unit 401 and then, after color conversion processing, is sent to the correction processing unit 402 and then the HT processing unit 403. Also, the correction processing unit 402 performs tone conversion for suppressing density non-uniformity using a different correction table for each module or each nozzle. Thereafter, the image forming unit 107 forms an image (formed image 400 in FIG. 4) on a sheet on the basis of the image data after HT processing. Also, the image acquisition unit 108 acquires the spectral reflectance $\rho x(x, y, \lambda)$ of each image position by reading the image formed on the sheet.

Note that in a case in which the resolution of the spectral reflectance $\rho x(x, y, \lambda)$ and the resolution of the input image (CMYK) is different at the image acquisition unit 108, resolution conversion is preferably performed on the spectral reflectance $\rho x$ to make them match. In the resolution conversion, a known method, such as the nearest neighbor method, the bilinear interpolation method, or the bicubic interpolation method, may be used. Also, in a case in which the sheet has a large skew or there is a large aberration with the spectroscopic sensor, geometric correction is preferably performed on the spectral reflectance $\rho x$. In the geometric correction, a known method, such as affine transformation or homography, may be used. In this case, the image processing unit may be provided with a resolution conversion processing unit and a geometric correction processing unit. Alternatively, the spectral reflection characteristic ρx may be calculated per a predetermined line number when the image acquisition unit 108 acquires a raster image. At this time, a marker to facilitate the conversion may be assigned and the image formed.

In step S603, the estimation processing selection unit 404 selects the target region on the basis of the spectral reflectance ρx(x, y, λ). In the present embodiment, a square region centered at pixel position xi, yi is selected as the target region. Note that the estimation region may be selected on a pixel basis rather than selected on a block basis as described above. Alternatively, instead of a square region, a rectangular region or a circular region may be used. Also, instead of the specified region being specified on the basis of the spectral reflectance, the specified region may be specified on the basis of image data (CMYK).

In step S604, the estimation processing selection unit 404 determines whether or not color exclusive processing is needed for the target region on the basis of the image data corresponding to the target region. In a case in which color exclusive processing is determined to be not necessary, the process proceeds to step S605 and the estimation processing is performed by the first estimation processing unit 405. On the other hand, in a case in which color exclusive processing is determined to be necessary, the process proceeds to step S606.

In step S606, the second estimation processing unit 406 executes color exclusive processing and then in step S607 performs the estimation processing. The determination of step S604 and the processing of steps S605 to S607 are described below in detail.

In step S608, the estimation processing selection unit 404 determines whether or not the estimation processing of step S605 or step S607 has been completed for all regions. Alternatively, it may be determined whether or not estimation processing has been completed for all representative regions predetermined in advance for the modules and the nozzles. Here, for example, the most flat region may be set in advance for each position corresponding to the modules and the nozzles in the image data (CMYK).

In step S609, the correction processing unit 402 deduces the ink characteristic of each nozzle or module from the signal values of each ink and the spectral reflectance of each ink at the target position deduced in step S605 or step S607 and corrects the correction table on the basis of the characteristic. This processing is described below in detail.

In step S610, the CPU 100 determines whether or not all outputs specified by the job have been completed. In a case in which all outputs have been completed, user image printing processing ends. On the other hand, in a case in which all outputs have not been completed, the process returns to step S602 and printing continues.

Note that in a case in which the processing of steps S603 to S608 and the processing by the HT processing unit 403 on the post-correction image is not executed in time with respect to the user image output or reading speed in step S602, correction processing may be intermittently executed. For example, correction processing and HT processing may be executed every ten sheets. Here, the nine sheets therebetween may be read and discarded or the correction processing may be executed on the basis of the average value of ten sheets. Alternatively, in a case in which there is a limitation on the reading speed, a different position may be read for each formed image of the ten sheets, and the correction processing may be executed on the basis of a combined spectral reflectance.

Determining Whether Color Exclusive Processing is Necessary (Step S604)

Determining whether or not color exclusive processing is necessary (step S604) will now be described. On the basis of the result of the determination of necessity, the estimation processing selection unit 404 selects whether to perform the estimation processing with the first estimation processing unit 405 or the second estimation processing unit 406. In the present embodiment, the selection processing is performed using a table (exclusivity table) indicated the exclusive relationships of the inks created in advance.

FIGS. 7A and 7B are diagrams illustrating examples of exclusivity tables. FIG. 7A is an example of an exclusivity table and is a classification table in which the inks are classified using a two rank system (yes, no (indicated by O, X respectively in FIG. 7A)) for reflectivity in each wavelength range on the basis of the spectral reflectance characteristic of each ink. For example, for '255', which is the maximum color signal value, an average reflectivity in the wavelength range of 0.9 or greater is classified as 'yes', and less than 0.9 is classified as 'no'. Note that prior to printing the user image, for example, a dedicated chart can be output and the exclusivity table can be created from the read result.

The estimation processing selection unit 404 determines whether or not the color exclusive processing is necessary on the basis of the exclusivity table, number of inks mixed in the target region, and the ink color (C, M, Y, K).

Figure 8:
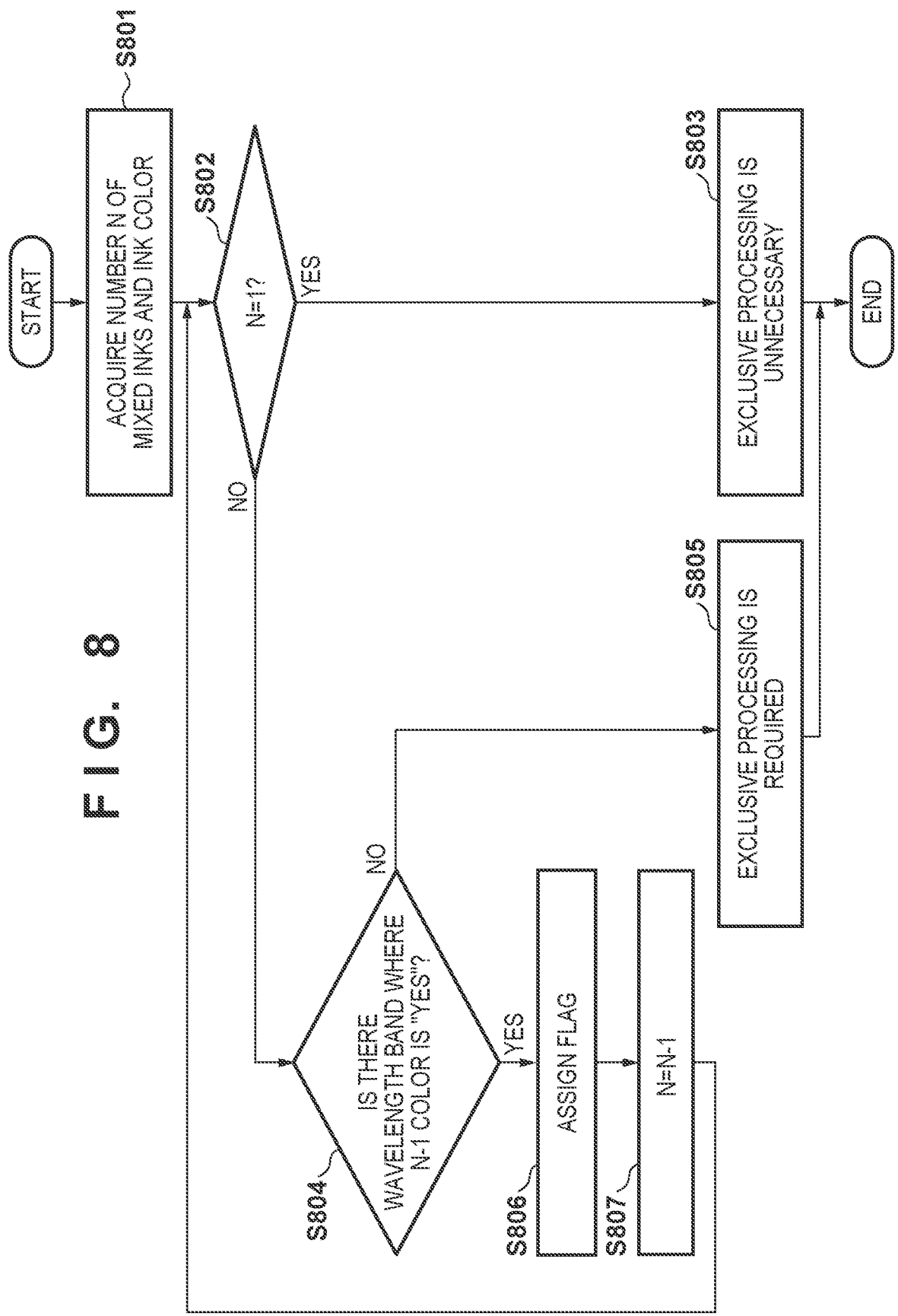
FIG. 8 is a detailed flowchart for determining whether color exclusive processing is necessary (step S604).

FIG. 8 is a detailed flowchart for determining whether color exclusive processing is necessary (step S604).

In step S801, the estimation processing selection unit 404 references the image data (CMYK) and acquires the number N of mixed inks included in the target region and the type thereof. Specifically, the image data corresponding to the target region is referenced, and an ink with a signal value that is not 0 is acquired and counted. In a case in which the signal value of the C ink, the M ink, and the Y ink is greater than 0 and the signal value of the K ink is 0, the number N of mixed inks is 3, with the ink color being CMY.

In step S802, the estimation processing selection unit 404 determines whether or not the number N of mixed inks is 1. In a case in which the number N of mixed inks is 1, in step S803, it is determined that exclusive processing is unnecessary, and the selection processing (step S604) ends. On the other hand, in a case in which N is not 1, the process proceeds to step S804.

In step S804, the estimation processing selection unit 404 references the exclusivity table indicated in FIG. 7A and determines whether or not there is a wavelength band for which an ink of an N−1 color or higher is 'yes'. In this example, the target region is a CMY mix (N=3). Here, from the table indicated in FIG. 7A, in the 480 to 530 nm wavelength band, the ink of two colors, the C ink and the M ink, have a 'yes'. In a similar manner, in the 630 to 680 nm wavelength band and the 680 to 730 wavelength band, the ink of two colors, the M ink and the Y ink, have a 'yes'. Here in step S804, the estimation processing selection unit 404 determines that there is a wavelength band for which an ink of an N−1 color or higher is 'yes'. In step S804 described above, in a case in which it is determined that there is a wavelength band, the process proceeds to step S806. On the other hand, in a case in which it is determined that there is not a wavelength band, the process proceeds to step S805, and it is determined that exclusive processing is necessary and the selection processing (step S604) ends.

In step S806, the estimation processing selection unit 404 assigns a flag to any one of the ink colors acquired in step S801. Specifically, the exclusivity table is referenced and a flag is assigned to the one among the ink not assigned with a flag that has the most number of 'no'. For example, in the case of a CMY mix (N=3), either the C ink or the M ink is selected at random and assigned. Alternatively, the reflectivity of the wavelength band with a 'yes' overlapping with the Y ink may be referenced, and a flag may be assigned to the ink with the value furthest from 1.0. In another example, after flag assignment, a flag may be assigned so that more wavelength bands with a 'yes' overlap between inks with no flag assigned. For example, using the example described above, because M and Y overlap in two wavelength bands, but C and Y only overlap in one, the C ink is assigned with a flag.

Also, in step S806, the estimation processing selection unit 404 assigns a flag to one wavelength band in which the flagged ink described above is 'no' but the other inks are all 'yes'. For example, in the example described above, in a case in which the C ink has been assigned with a flag, a flag is assigned to either 630 to 680 or 680 to 730. In a case in which there are a plurality of wavelength bands that satisfy the condition, one may be selected at random or the larger wavelength band may be selected. Alternatively, the average value among the inks of the reflectivity of the wavelength bands may be calculated, and a flag may be assigned to the wavelength band closest to 1.0. In the following processing of step S804, the determination is performed ignoring the wavelength band and the ink color assigned with a flag.

After flag assignment, in step S807, the estimation processing selection unit 404 updates the number N of mixed inks to N−1, and the process returns to step S802. In other words, the ink assigned with the flag, for example, the C ink, is removed by virtue of the flag, and regarding the mix of the remaining N=2 inks, for example, M and Y, determination for whether or not exclusive processing can be performed is performed. Here, so that the wavelength bands used in the following estimation processing do not overlap, determination is performed with the wavelength band used in the C ink estimation removed by virtue of the flag.

By performing the process according to steps S801 to S807 described above, whether or not color exclusive processing is necessary can be determined. Note that the flow indicated in FIG. 8 may be performed in advance for all ink combinations, and the result may be held in the form of an exclusivity table such as that indicated in FIG. 7B. In this case, instead of the flow indicated in FIG. 8, the exclusivity table indicated in FIG. 7B is referenced on the basis of the ink color acquired in step S801 and whether or not exclusive processing is necessary is determined.

Estimation Processing by First Estimation Unit

Figure 9:
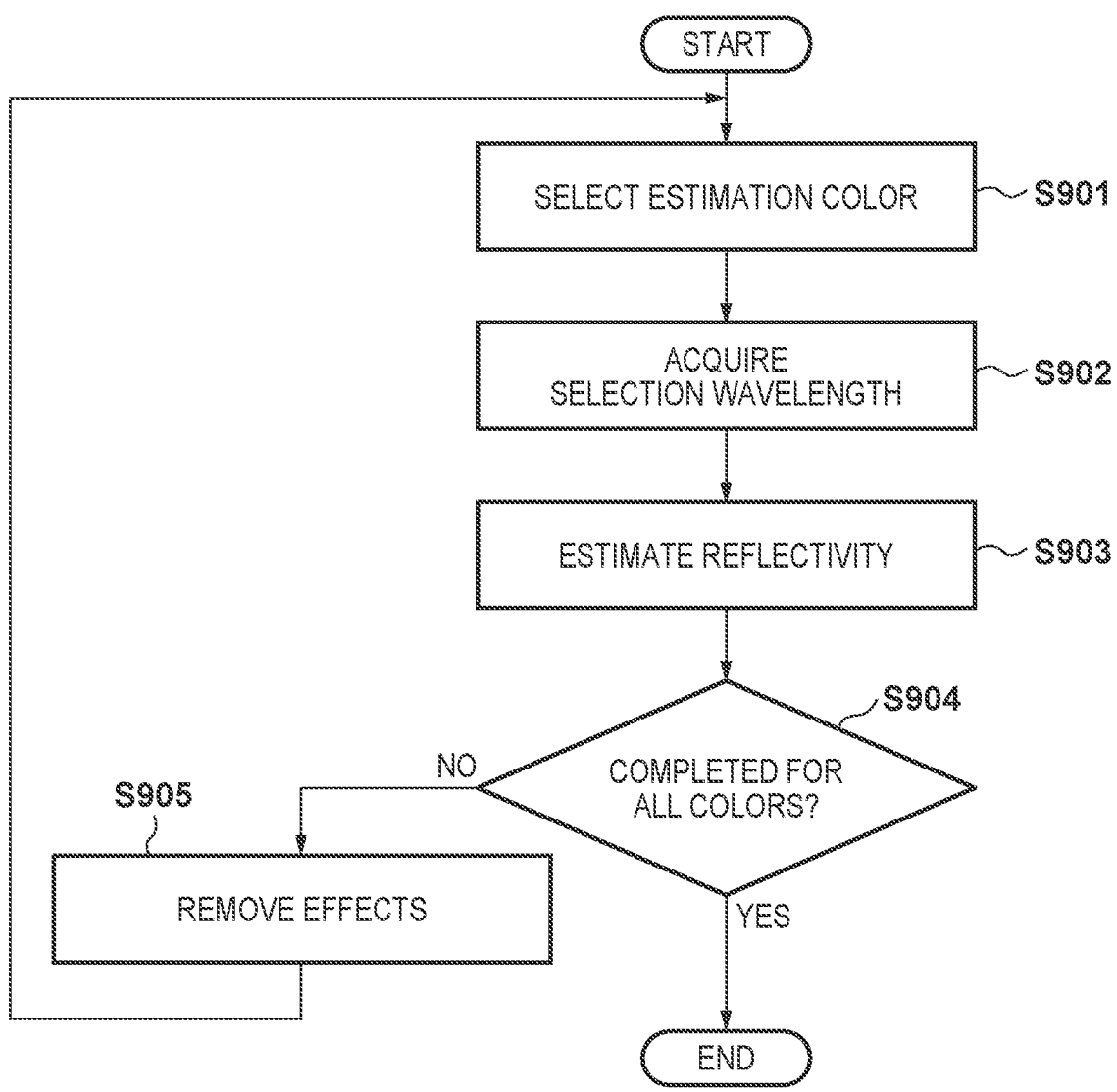
FIG. 9 is a flowchart of estimation processing (step S605) performed by a first estimation unit.

FIG. 9 is a flowchart of the estimation processing (step S605) performed by the first estimation unit. The estimation processing will be described below in detail following the flow indicated in FIG. 9.

In step S901, the first estimation unit 4051 references the processing order 4053 and selects the estimation color. For example, in a case in which the order stored in the processing order 4053 is CMY, first, C is selected as the estimation color. Note that the processing order may follow the order in which the flags are assigned in step S806 described above.

In step S902, the first estimation unit 4051 acquires the wavelength corresponding to the estimation color from the selection wavelength 4052. In a case in which the estimation color is C, $\lambda=700$ nm is acquired, for example. Note that, from among the wavelength bands assigned with a flag in step S806 described above, the wavelength with the lowest reflectivity is selected as the selected wavelength together with the estimation color. Also, the wavelength with the lowest reflectivity from among all of the wavelength bands of the inks not assigned with a flag in step S806 is selected.

In step S903, the first estimation unit 4051 estimates the reflectivity or the density as the ink characteristic of the estimation color. For example, the spectral reflectance $\rho x(xi, yi, 700)$ is acquired as the C ink characteristic at position xi, yi.

In step S904, the first estimation unit 4051 determines whether or not the estimation processing for all of the ink colors set by the processing order 4053 has been completed. In a case in which the estimation processing has not been completed, the process proceeds to step S905. On the other hand, in a case in which the estimation processing has been completed, the estimation processing (step S605) of the target position ends.

In step S905, the first estimation unit 4051 removes the effects of the most recent ink color estimated in step S903 from the spectral reflectance $\rho x(xi, yi, \lambda)$. Specifically, first, the reference ink characteristic 4054 is referenced and the reflectivity of the estimation color is acquired. However, herein, the reference ink characteristic corresponds to a relationship between a predetermined printing amount and a reflectivity for each ink. For example, the spectral reflectance characteristics $\rho c(kc, \lambda)$, $\rho m(km, \lambda)$, $\rho y(ky, \lambda)$, and $\rho k(kk, \lambda)$ are obtained by, after a uniform pattern of each ink is formed by the image forming unit 107 and this is acquired by the image acquisition unit 108, finding the average in the conveyance or nozzle arrangement direction.

In the present embodiment, prior to printing the user image, the spectral reflectance characteristic of each ink described above are acquired from a dedicated chart, for example, and stored as the reference ink characteristic 4054. Here, in step S905, the first estimation unit 4051 acquires the spectral reflectance characteristic $\rho c(kc, \lambda)$ of the C ink using the reference ink characteristic 4054, for example. Also, the printing amount kc where $\rho x(xi, yi, 700)=\rho c(kc, 700)$ is calculated. Then, by calculating $\rho x'=\rho x(xi, yi, \lambda)/\rho c(kc, \lambda)$, the effects of the C ink can be removed. In this manner, using the newly obtained spectral reflectance $\rho x'$ as the spectral reflectance $\rho x(xi, yi, \lambda)$ in the following processing, the process returns to step S901. Thereafter, the M ink is newly selected in step S901, and then the process proceeds to step S902.

By performing the process following steps S901 to 905 described above, the primary color estimation processing (step S605) performed by the first estimation unit ends, and the reflectivity of each ink in the target pixel region is estimated.

Estimation Processing by Second Estimation Unit

First, the color exclusive processing in step S606 in FIG. 6 will be described. In step S606, the color exclusive processing unit 4061 first performs logarithmic conversion on the spectral reflectance $\rho x(xi, yi, \lambda)$ and calculates a spectral density $d(\lambda)$. Also, by referencing the color conversion matrix 4063 and performing a matrix operation using conversion matrix X described above on the spectral density $d(\lambda)$, a post-conversion spectral density $d'(\lambda)$ is acquired.

Furthermore, each virtual ink density is calculated on the basis of the spectral density $d'(\lambda)$ obtained in this manner. Specifically, the average value of the spectral density $d'(\lambda)$ in 630 to 680 nm is taken as a virtual C ink density dvc. Also, the average value in 530 to 580 nm is taken as the virtual M ink density dvm, the average value in 430 to 480 nm is taken as the virtual Y ink density dvy, and the average value in 380 to 430 nm is taken as the virtual K ink density dvk. Note that prior to printing the user, in the present embodiment, the conversion matrix X with the smallest error with respect to the following Mathematical Formula (2) is calculated in advance and stored in the conversion matrix 4063.

$$\begin{bmatrix} d_{(vc,380)} & d_{(vc,390)} & d_{(vc,400)} & \cdots & d_{(vc,720)} & d_{(vc,730)} \\ d_{(vm,380)} & d_{(vm,390)} & d_{(vm,400)} & \cdots & d_{(vm,720)} & d_{(vm,730)} \\ d_{(vy,380)} & d_{(vy,390)} & d_{(vy,400)} & \cdots & d_{(vy,720)} & d_{(vy,730)} \\ d_{(vk,380)} & d_{(vk,390)} & d_{(vk,400)} & \cdots & d_{(vk,720)} & d_{(vk,730)} \end{bmatrix} = \begin{bmatrix} d_{(c,380)} & d_{(c,390)} & d_{(c,400)} & \cdots & d_{(c,720)} & d_{(c,730)} \\ d_{(m,380)} & d_{(m,390)} & d_{(m,400)} & \cdots & d_{(m,720)} & d_{(m,730)} \\ d_{(y,380)} & d_{(y,390)} & d_{(y,400)} & \cdots & d_{(y,720)} & d_{(y,730)} \\ d_{(k,380)} & d_{(k,390)} & d_{(k,400)} & \cdots & d_{(k,720)} & d_{(k,730)} \end{bmatrix} X \quad (2)$$

However, $d(x, \lambda)$ on the right side of Mathematical Formula (2) is the spectral density at wavelength $\lambda$ (nm) of ink x and can be calculated using $d = \log 10(1/\rho)$ from the spectral reflectance $p(x, \lambda)$ for 255, the maximum color signal value. Note that x is specifically any one of CMYK (each one indicating c, m, y, or k). Also, in this example, $\lambda$ is a value in 10 nm increments in a range from 380 to 730 nm.

Figure 10:
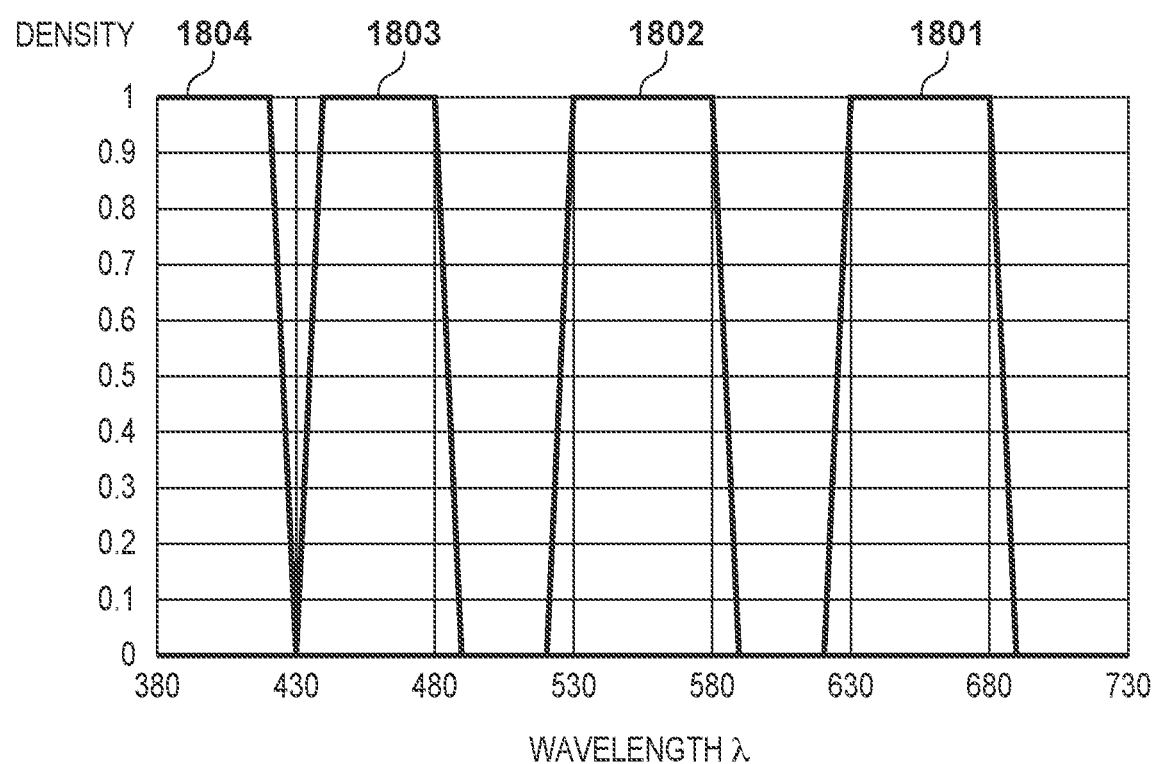
FIG. 10 is a diagram illustrating an example of the spectral density of a virtual ink.

FIG. 10 is a diagram illustrating an example of the spectral density of a virtual ink. $d(vx, \lambda)$ on the left side is the spectral density of each virtual ink, and spectral densities such as those indicated by spectral densities 1801 to 1804 in FIG. 10 can be used, for example. For example, in a case in which 1801 is the spectral density $d(vc, \lambda)$ of the virtual C ink, only the wavelength band corresponding to $\lambda = 630$ to 680 nm is 1.0 and all the other wavelength bands are 0.0. In a similar manner, 1802 corresponds to the spectral density of the virtual M ink, 1803 corresponds to the spectral density of the virtual Y ink, and 1804 corresponds to the spectral density of the virtual K ink. In this case, the wavelength band corresponding to 530 to 580 is 1.0 for the virtual M ink, the wavelength band corresponding to 430 to 480 is 1.0 for the virtual Y ink, the wavelength band corresponding to 380 to 430 is 1.0 for the virtual K ink, and all other wavelength bands are 0.0. In the present embodiment, the estimation processing for the reflectivity of each ink is performed by the second estimation unit in the following step S607 on the basis of each virtual ink density obtained in this manner.

Figure 11A:
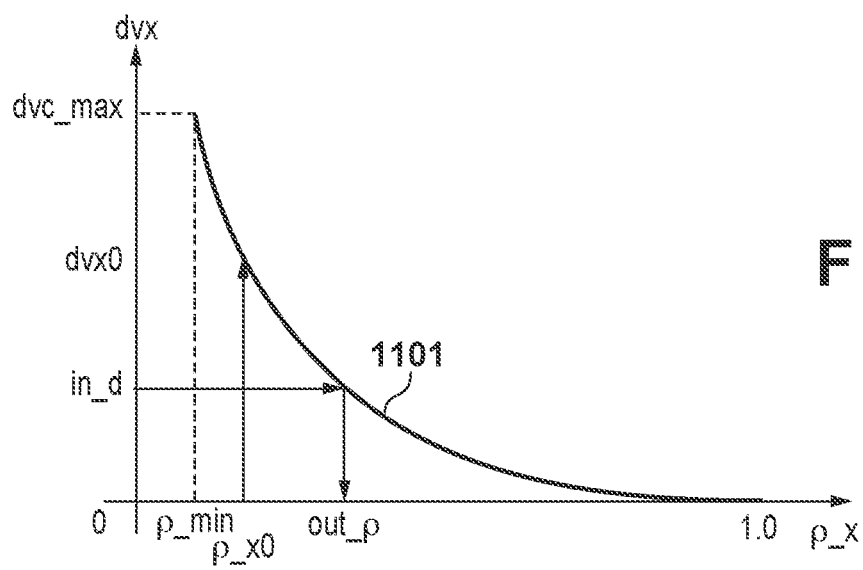
FIGS. 11A to 11C are diagrams for describing estimation processing (step S607) performed by a second estimation unit.
Figure 11B:
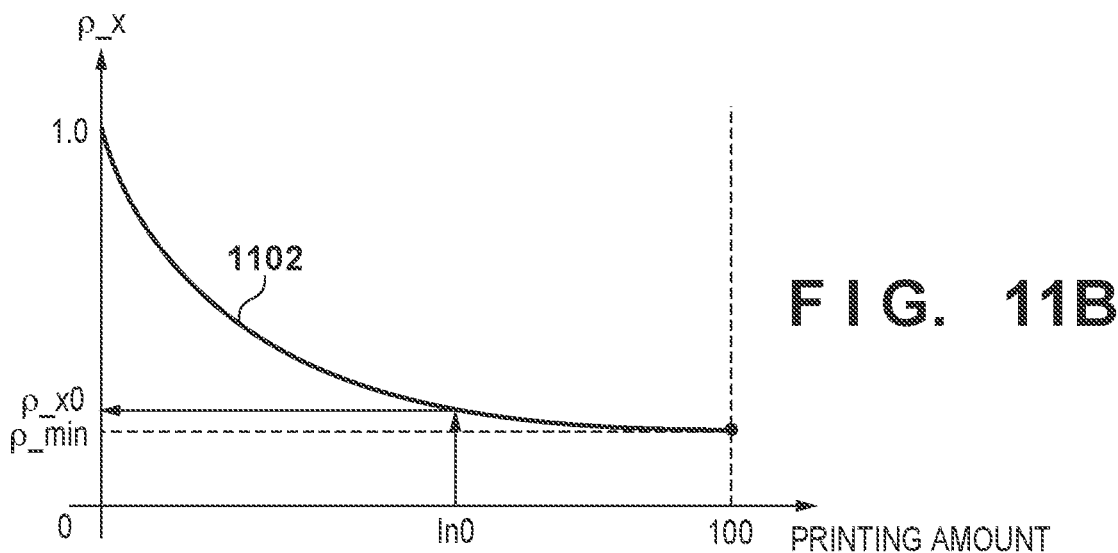
Figure 11C:
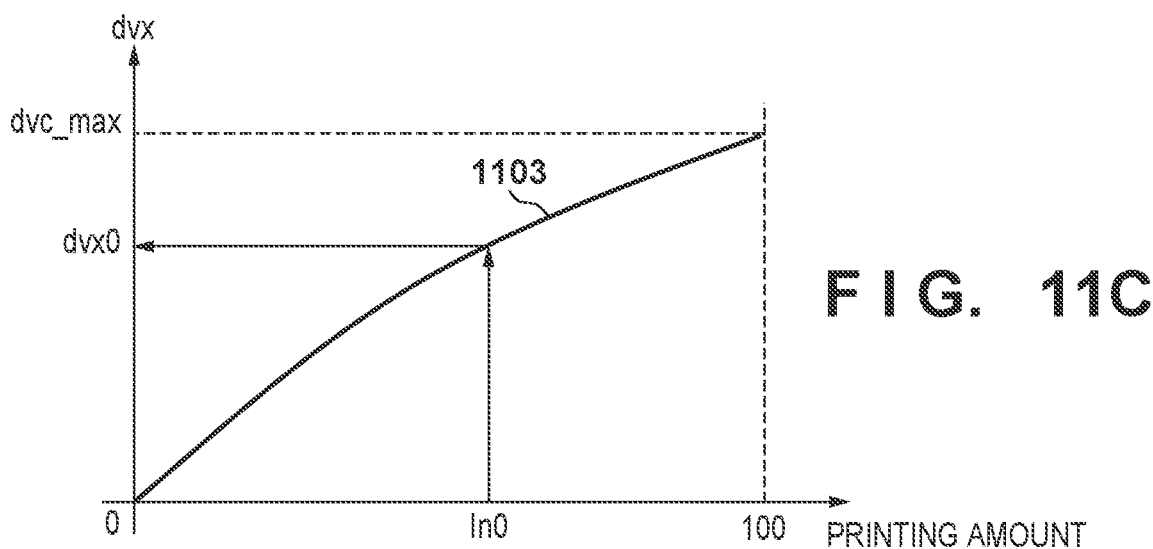

FIGS. 11A to 11C are diagrams for describing the estimation processing (step S607) performed by the second estimation unit. Note that prior to printing the user image, in the present embodiment, in advance the dedicated chart the output, and the relationship between each virtual ink and the reflectivity of the corresponding ink from the read result is held as the virtual ink characteristic 4064. The method of calculating the virtual ink characteristic 4064 will be described below in detail.

The second estimation unit first references the virtual ink characteristic 4064 and acquires the relationship between the density dvx of each virtual ink and the reflectivity $\rho\_x$ of the corresponding ink (any one of the CMYK inks) as indicated by a curved line 1101 in FIG. 11A. For example, the relationship between the virtual C ink density d_c and the reflectivity $\rho\_c$ at a wavelength $\lambda$ of 700 in a case in which a single color, the C ink, is used in formation is acquired. Then, from the relationship between the obtained virtual ink density and the reflectivity, the density of each virtual ink obtained in step S607 is converted to the reflectivity of the corresponding ink. Specifically, out_$\rho$ is calculated from in_d in FIG. 11A.

Calculating Virtual Ink Characteristic 4064

Specifically, to obtain the virtual ink characteristic 4064 such as that indicated by the curved line 1101, first, the printing amount of any one ink, the C ink for example, is changed and used to form images using the image forming unit 107. By reading the formed uniform patch with the image acquisition unit 108, the spectral reflectance characteristic $\rho(kc, \lambda)$ of the C ink is obtained. Here, the reflectivity at the wavelength $\lambda$ at which the reflectivity is the minimum, for example $\lambda=700$, is acquired as $\rho\_c$.

A curved line 1102 in FIG. 11B is a curved line indicating an example of the relationship between the reflectivity obtained in this manner and the printing amount. The curved line 1102 can be obtained using a known interpolation method on the combination of the printing amount and the reflectivity.

Next, logarithmic conversion is performed on the obtained spectral reflectance characteristic $\rho(kc, \lambda)$, and the spectral density $d(kc, \lambda)$ with respect to each printing amount kc of the C ink is obtained. Furthermore, $d(kc, \lambda)$ is converted using the conversion matrix X described above, and a spectral density $d'(kc, \lambda)$ obtained after exclusive processing is performed on the printing amount kc of the C ink is obtained. Thereafter, the spectral density $d'(kc, \lambda)$ is averaged to obtain the virtual C ink density dvc(kc). Note that here, the range for averaging used is the wavelength band 630 to 680 nm in which the virtual C ink spectral density corresponds to 1.0 with respect to the maximum color signal value of 255 as indicated in FIG. 10 described above.

In this manner, by applying a known interpolation technique on the obtained virtual C ink density dvc(kc) and the printing amount calculated from the density, the relationship between the printing amount and the virtual C ink density indicated by a curved line 1103 in FIG. 11C is obtained.

Then, the relationship (curved line 1101) between the reflectivity and the virtual ink is calculated from the relationship (curved line 1102) between the printing amount and the reflectivity described above and the relationship (curved line 1103) between the printing amount and the virtual ink density. In other words, the reflectivity $\rho\_x0$ with respect to the printing amount In0 is obtained from the relationship between the printing amount and the reflectivity (see the arrows in FIG. 11B). In a similar manner, the density dvx0 of the virtual ink with respect to the printing amount In0 is obtained from the relationship between the printing amount and the virtual ink density (see the arrows in FIG. 11C). Then, the reflectivity $\rho\_x0$ and the density dvx0 are associated together (see the arrows in FIG. 11A) and held as the virtual ink characteristic 4064. Here, the virtual ink characteristic may be the reflectivity p_x and the density dvx associated together and held as a LUT, or the virtual ink characteristic may be held as a function calculated using a known fitting.

Correction Table Correction (Update) Processing

FIGS. 12A to 12D are diagrams for describing the correction table update processing (step S608). FIG. 12A is a diagram on which the relationship between the reflectivity at each pixel position (x, y) estimated in step S605 or step S607 and the color signal value that is the target for the image formation processing is plotted with regard to the target module or nozzle. Note that the horizontal axis in the diagram represents any one of the CMYK color signal values. The vertical axis represents, from among the estimated reflectivity $\rho c, \rho m, \rho y, \rho k$ of the inks, the reflectivity corresponding to the color signal value.

A curved line 1201 is a curved line indicating the ink characteristic of the head module or the nozzle calculate on the basis of the plotted points. The curved line 1201 can be a polynomial function obtained by a known method of least squares, for example. Alternatively, after averaging the points in a section obtained by dividing the color signal value axis as illustrated in FIG. 12B and obtaining representative values for the reflectivity and the color signal value, a continuous value (curved line 1202 in FIG. 12C) can be obtained by performing an interpolation operation on the representative values of each section. Here, the interpolation method is discretionary, and a sectional linear interpolation method or a known spline method may be used, for example.

A curved line 1203 of the FIG. 12D is a curved line indicating the ink characteristic of the module or head targeted for correction. Also, a dot-dash line 1204 indicates the target characteristic of the correction processing. Note that the target characteristic will be described below in detail.

First, the target reflectivity ρ_t corresponding to the input color signal value In is calculated using the dot-dash line 1204. Next, the color signal value out corresponding to the target reflectivity ρ_t is acquired from the curved line 1203 as the correction value. In this manner, by associating together and storing the acquired correction value out and the input color signal value In, the correction table can be created. Here, as the input signal value In, a correction value may be calculated for all values from 0 to 255 and held as a target nozzle table. Alternatively, only values corresponding to a predetermined tone (0, 16, 32, . . . , 240, 255) as illustrated in FIG. 5 may be calculated and held as a table.

Note that only one ink characteristic is illustrated in FIG. 12D. However, in reality, a number of curved lines equal to the number of modules or nozzles is obtained. By repeating the process described above on all of these, the correction value corresponding to each module or each nozzle can be calculated.

Note that prior to printing the user image, by using a dedicated chart including a uniform pattern of each ink as a single color in advance and forming a correction table, in the correction from the user image, the likelihood of falling into a local solution can be reduced. This is preferable also because the likelihood of correction directly after printing starting taking a long time and the color changing each time printing is performed can be reduced.

In the update processing described above, for example, the ink characteristic for which the color signal value and the reflectivity are linear can be used as the target characteristic. Alternatively, using any one of the modules or nozzles as a reference, the ink characteristic of this module or nozzle may be set as the target characteristic.

Figure 13:
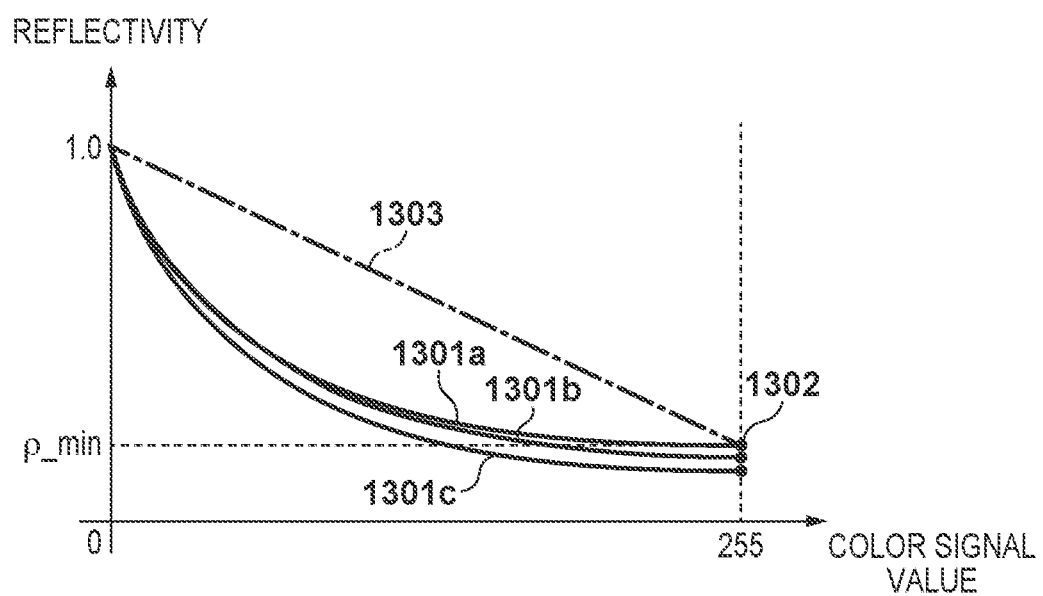
FIG. 13 is a diagram for describing setting the target characteristic.

FIG. 13 is a diagram for describing setting the target characteristic. Note that in the example described hereinafter, color matching on a head module basis is performed and the target characteristic of the C ink is decided from the ink characteristic of the head modules 201a, 201b, 201c. Curved lines 1301a to 1301c indicate the reflectivity characteristics ρ of the head modules 201a to 201c. For example, a wavelength kc of 700 nm is set for the C ink by the wavelength selection unit 4043. Here, the reflectivity ρ can be calculated by performing a known interpolation method on the printing amount of each color signal value and the spectral reflectance characteristic ρc(kc, 700).

Here, to determine the target characteristic so that the color signal value and the reflectivity are linear, first, a reflectivity ρ_min of the head with the greatest reflectivity with respect to the maximum color signal value is acquired.

In the example illustrated in FIG. 13, the reflectivity corresponding to 255 of curved line 1001a corresponding to the head 201a is ρ_min (1302 in the diagram). Also, a straight line 1303 connecting two points, reflectivity 1.0 at color signal value 0 and reflectivity ρ_min at maximum signal value 255, is taken as the target characteristic.

Alternatively, a curved line 1301b corresponding to the head module 201b most centrally located in the configuration of the heads illustrated in FIG. 2B may be used as the target characteristic. Also, the average value of all modules or a portion of the modules can be used as the target characteristic. For example, a not illustrated curved line obtained by averaging the curved lines 1301a, 1301b, and 1301c with respect to the color signal values may be used as the target characteristic.

Also, a target characteristic based on another value and not the reflectivity characteristic may be set. For example, the target characteristic may be set so that a distance D from the recording medium color (paper white) in the CIELAB color space and the color signal values are linear. Note that the distance D from paper white can be calculated using the following Mathematical Formula (3). Note that in Mathematical Formula (3), Lw, La, and Lb are Lab values of the recording medium colors.

$$D=\sqrt{(L-L_w)^2+(a-a_w)^2+(b-b_w)^2} \quad (3)$$

According to the first embodiment as described above, depending on the degree of exclusivity of the ink included in the target region, different methods of estimating the change in density can be switched to and used. Specifically, the method using wavelengths able to be exclusively estimated and an estimation order and the method using a matrix for converting to virtual ink are selectively used. Accordingly, the region used in estimation can be enlarged while an increase in the processing time can be kept to a minimum.

First Modified Example

As described above, the spectral density d(λ) obtained from the spectral reflectance ρx(xi, yi, λ) is used in a matrix for obtaining the spectral density d'(λ). Also, when calculating the ink characteristic of the modules or nozzles, for the C ink, for example, the average value in 630 to 680 nm is used. Here, instead of calculating the spectral density d(λ) using the conversion matrix, a matrix for converting directly to the virtual ink density used in calculating the ink characteristic can be used.

In this case, in step S1702, a color conversion matrix calculation unit 4044 may calculate the conversion matrix X satisfying the following Mathematical Formula (4). Here, Vc, Vm, Vy, Vk on the left side in Mathematical Formula (4) are the virtual ink densities used in calculating the ink characteristic.

$$\begin{bmatrix} Vc & 0 & 0 & 0 \\ 0 & Vm & 0 & 0 \\ 0 & 0 & Vy & 0 \\ 0 & 0 & 0 & Vk \end{bmatrix} = \quad (4)$$

$$\begin{bmatrix} d_{(c,380)} & d_{(c,390)} & d_{(c,400)} & \cdots & d_{(c,720)} & d_{(c,730)} \\ d_{(m,380)} & d_{(m,390)} & d_{(m,400)} & \cdots & d_{(m,720)} & d_{(m,730)} \\ d_{(y,380)} & d_{(y,390)} & d_{(y,400)} & \cdots & d_{(y,720)} & d_{(y,730)} \\ d_{(k,380)} & d_{(k,390)} & d_{(k,400)} & \cdots & d_{(k,720)} & d_{(k,730)} \end{bmatrix} X$$

Also, Mathematical Formula (3) and Mathematical Formula (4) represent a formula of only first order terms, but second order terms or third order terms may be used in the case of a large error. For example, using the following Mathematical Formula (5) obtained by adding second order terms to Mathematical Formula (4), X with the minimum error may be used.

$$\begin{bmatrix} Vc & 0 & 0 & 0 \\ 0 & Vm & 0 & 0 \\ 0 & 0 & Vy & 0 \\ 0 & 0 & 0 & Vk \end{bmatrix} = \begin{bmatrix} d_{(c,380)} & d_{(c,390)} & \cdots & d_{(c,730)} & d_{(c,380)^2} & \cdots & d_{(c,730)^2} \\ d_{(m,380)} & d_{(m,390)} & \cdots & d_{(m,730)} & d_{(m,380)^2} & \cdots & d_{(m,730)^2} \\ d_{(y,380)} & d_{(y,390)} & \cdots & d_{(y,730)} & d_{(y,380)^2} & \cdots & d_{(y,730)^2} \\ d_{(k,380)} & d_{(k,390)} & \cdots & d_{(k,730)} & d_{(k,380)^2} & \cdots & d_{(k,730)^2} \end{bmatrix} X \quad (5)$$

Note that in description up until now, actual ink and virtual ink have been associated in a one to one relationship. However, a plurality of actual inks may be associated with a single virtual ink density. For example, a conversion table for resolving the virtual C ink density per unit to the ink CMYK may be stored in advance, and, via resolution using the table, the reflectivity may be calculated on the basis of a totaled value for each ink.

For example, as a conversion amount with respect to a virtual C ink density of 0.1, a printing amount of 10% for the C ink and a printing amount of 8% for the M ink is stored in the table in advance. Here, in a case in which a virtual C ink density of 0.3 is used in the calculation, the table is referenced and 10%×0.3/0.1=30% for the printing amount of the C ink is obtained. In a similar manner, a printing amount of 24% for the M ink is obtained.

In a similar manner, in a case in which a printing amount for the C ink of 5% is obtained from the virtual M ink density and 6% is obtained from the K ink density, the sum of the printing amount of the C ink, i.e., 30+5+6=41%, is obtained. The sum of the printing amounts of each ink obtained in this manner may be converted to the reflectivity as illustrated in FIG. 11C.

Second Embodiment

In the second embodiment described herein, an RGB sensor that covers the entire width of the sheet surface is used in addition to the spectroscopic sensor. In the first embodiment described above, the spectral reflectance of each formed image can be acquired via the image acquisition unit 108. However, compared to a typical RGB sensor, a spectroscopic sensor needs more time to acquire data. Thus, the limiting factor for the correction interval is the time needed for acquiring the spectral reflectance, as opposed to calculating the characteristic of each ink from the mixed region. Alternatively, from the perspective of cost, instead of the entire width of the sheet surface, the measurement range of the spectroscopic sensor may be such that only a portion of the region can be measured.

In the second embodiment, first, prior to printing the user image, a matrix is created in which the output value of the RGB sensor and the reflectivity are associated together. Then, the correction table is corrected using the RGB values for the user image and the matrix.

The image processing unit 106 outputs and reads a dedicated chart including a uniform pattern of each ink as a single color. Here, for each ink, a uniform pattern of different printing amounts is read by both the RGB sensor and the spectroscopic sensor, and the spectral reflectance characteristic ρ of each ink and the sensor RGB value are acquired.

Next, the image processing unit 106 calculates a color conversion matrix for converting the sensor RGB value to the reflectivity of the ideal CMY ink. Specifically, first, the wavelength for each ink is determined from the spectral reflectance characteristic of the CMY ink. Furthermore, the densities Vc, Vm, Vy of the corresponding virtual inks obtained in the case in which each CMY ink is formed of a predetermined printing amount are set. For example, Vc=Vm=Vy=1.0 is set. Also, from the virtual ink densities Vc, Vm, Vy and the sensor RGB value, a matrix Y that satisfies the following Mathematical Formula (6) with a minimum error is calculated.

$$\begin{bmatrix} Vc & 0.0 & 0.0 \\ 0.0 & Vm & 0.0 \\ 0.0 & 0.0 & Vy \end{bmatrix} = \begin{bmatrix} \log_{10}Rc & \log_{10}Gc & \log_{10}Bc \\ \log_{10}Rm & \log_{10}Gm & \log_{10}Bm \\ \log_{10}Ry & \log_{10}Gy & \log_{10}By \end{bmatrix} Y \quad (6)$$

Rc in Mathematical Formula (6) is an output value of the R sensor in a case in which a uniform pattern formed of only the C ink and a predetermined printing amount is read. The predetermined printing amount may be 100%, 25%, or the like. In a similar manner, Gm is an output value of the G sensor in a case in which a uniform pattern formed of only the M ink and a predetermined printing amount is read. Note that instead of Mathematical Formula (6) described above, a formula including a second order term such as the following Mathematical Formula (7) can be used for the matrix Y with a minimum error. Naturally, third order terms may also be included.

$$\begin{bmatrix} \rho_{\_}c(kvc) & 1.0 & 1.0 \\ 1.0 & \rho_{\_}m(kvm) & 1.0 \\ 1.0 & 1.0 & \rho_{\_}y(kvy) \end{bmatrix} = \quad (7)$$

$$\begin{bmatrix} \log_{10}Rc & \log_{10}Gc & \log_{10}Bc & (\log_{10}Rc)^2 & (\log_{10}Gc)^2 & (\log_{10}Bc)^2 \\ \log_{10}Rm & \log_{10}Gm & \log_{10}Bm & (\log_{10}Rm)^2 & (\log_{10}Gm)^2 & (\log_{10}Bm)^2 \\ \log_{10}Ry & \log_{10}Gy & \log_{10}By & (\log_{10}Ry)^2 & (\log_{10}Gy)^2 & (y)^2 \end{bmatrix} Y$$

By using the matrix Y obtained in this manner, the virtual ink densities Vc, Vm, Vy can be calculated from the output values of the RGB sensor. In other words, when correction is performed on the basis of the reading result of the user image, only the RGB sensor needs to perform reading and the spectroscopic sensor does not need to perform reading. Thus, in a case in which reading by the spectroscopic sensor incur costs or limits speed, color stabilization can be performed at a higher speed or a lower cost.

However, in a case in which the matrix Y that satisfies Mathematical Formula (6) or Mathematical Formula (7) described above is used, the accuracy of the estimation processing in the region where the K ink is mixed may be reduced. Specifically, typically, K ink does not have an exclusive wavelength with respect to any of the CMY ink. Thus, the effects of the K ink in the mixed region affect all if the virtual ink densities Vc, Vm, Vy indicated on the left side in Mathematical Formula (6) described above, regardless of the selected wavelength. Estimating the reflectivity of each ink without taking this effect into account would cause the effects of the K ink to appear as an error in the reflectivity of each ink. By performing a correction processing on the basis of a reflectivity with an error, density non-uniformity may actually be caused.

Thus, the processing is preferably different for regions that include the K ink and regions that don't. Furthermore, in a region that includes the K ink, the processing is preferably changed depending on the number and type of the ink other than the K ink. The configuration of the image processing unit 106 and the color stabilization process according to the second embodiment will be described below using FIGS. 14 and 15. Note that configurations similar to that of the first embodiment will be given the same reference sign and detailed descriptions thereof will be omitted.

Functional Configuration of Image Processing Unit 106

Figure 14:
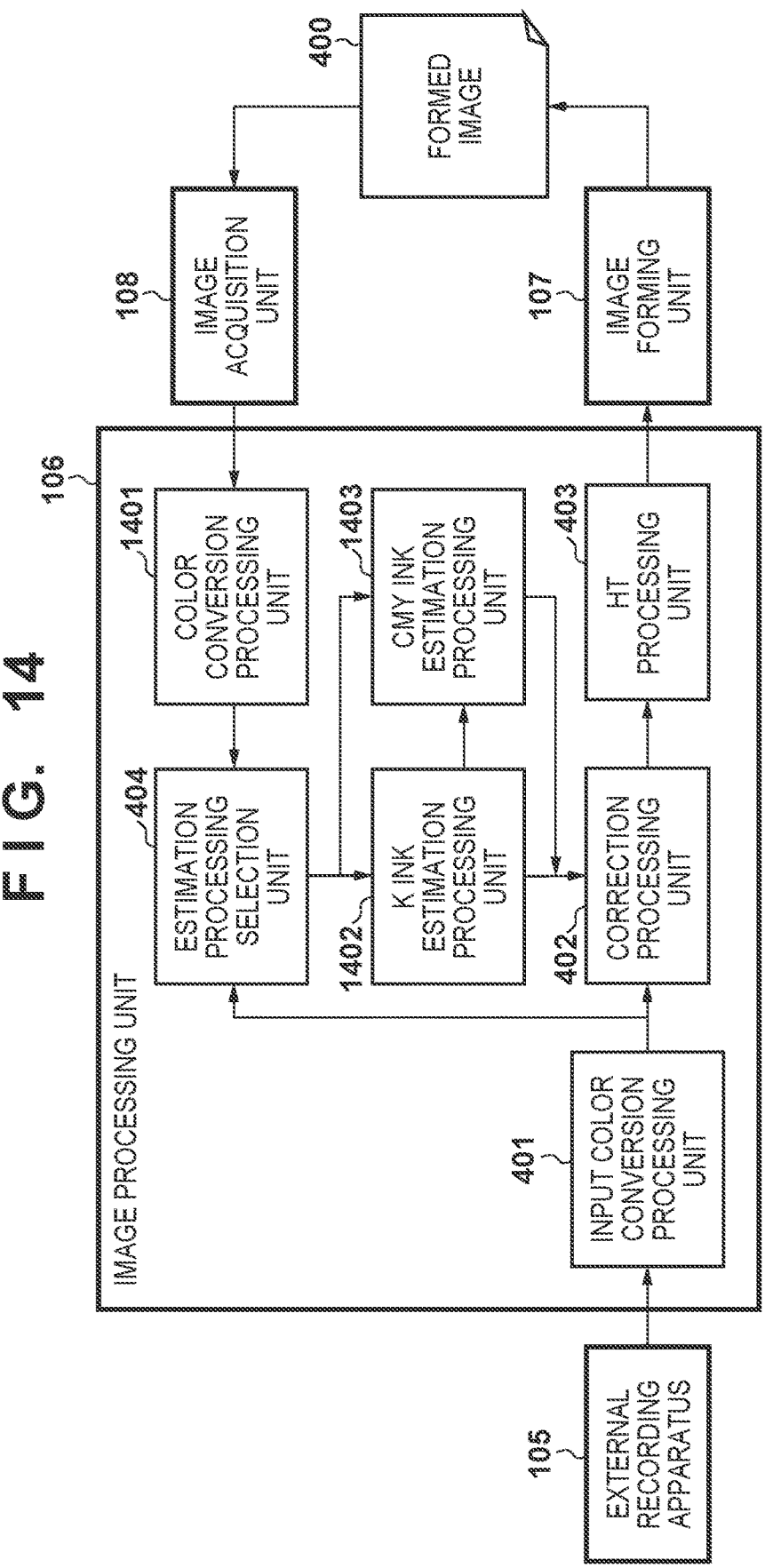
FIG. 14 is a diagram illustrating the functional configuration of an image processing unit according to a second embodiment.

FIG. 14 is a diagram illustrating the functional configuration of the image processing unit 106 according to the second embodiment. The image processing unit 106 is constituted by the input color conversion processing unit 401, the correction processing unit 402, the halftone (HT) processing unit 403, the estimation processing selection unit 404, a color conversion processing unit 1401, a K ink estimation processing unit 1402, and a CMY ink estimation processing unit 1403.

The color conversion processing unit 1401 uses the matrix Y (not illustrated) described above created and held in advance and estimates the virtual ink densities Vc, Vm, Vy for each pixel from the output values of the RGB sensor for each pixel acquired by the image acquisition unit. Also, the reflectivities ($\rho\_c$, $\rho\_m$, $\rho\_y$) of the CMY inks are calculated from the virtual ink densities Vc, Vm, Vy in a similar manner to that of step S607 described above.

Furthermore, the estimation process selection unit 404 assigns the reflectivity ($\rho\_c$, $\rho\_m$, $\rho\_y$) of the CMY ink calculated by the color conversion processing unit 1401 to either the K ink estimation processing unit 1402 or the CMY ink estimation processing unit 1403. Here, the assignment is performed on the basis of the image data (CMYK) acquired by the input color conversion processing unit 401. The details are described below with reference to FIGS. 15A and 15B.

The K ink estimation processing unit 1402 is a black estimation unit that estimates the reflectivity of the K ink on the basis of the reflectivity ($\rho\_c$, $\rho\_m$, $\rho\_y$) of the assigned CMY ink, the number of mixed inks, and the type thereof. The estimated reflectivity of the K ink is sent to the correction processing unit 402 and used in the K ink correction processing. Also, in a case in which the number of mixed ink is two or more, the effects of the reflectivity of the K ink estimated from the reflectivity ($\rho\_c$, $\rho\_m$, $\rho\_y$) of the assigned CMY ink are removed. Furthermore, the post-removal reflectivity is sent to the CMY ink estimation processing unit 1403.

The CMY ink estimation processing unit 1403 is a color estimation unit that estimates the reflectivity of each of the CMY inks on the basis of reflectivity ($\rho\_c$, $\rho\_m$, $\rho\_y$) of the CMY ink acquired by the estimation processing selection unit 404 or the K ink estimation processing unit 1402. The details are described below with reference to FIGS. 15A and 15B.

Correction Processing

Figure 15A:
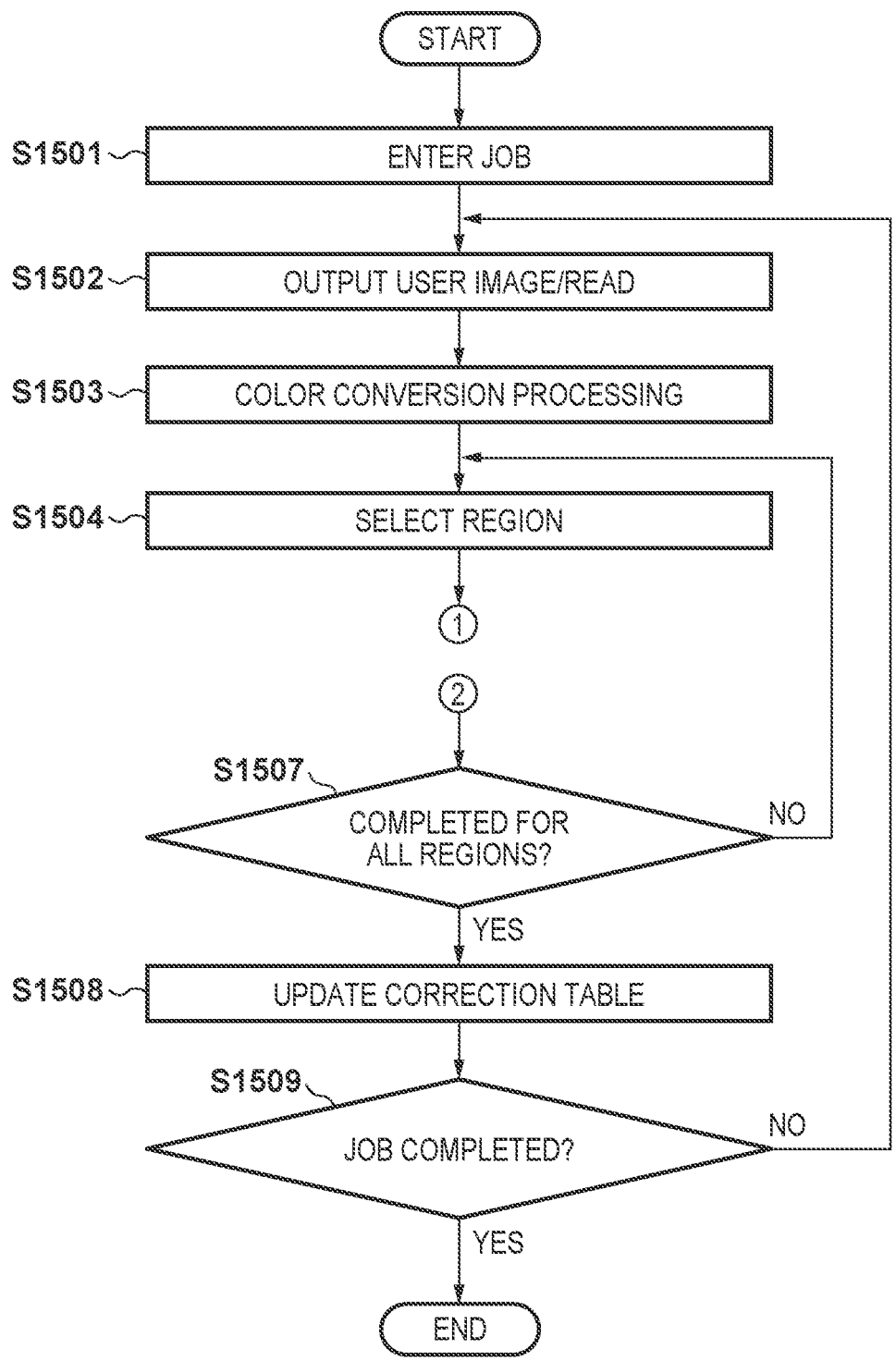
FIGS. 15A and 15B are flowcharts of correction processing according to the second embodiment.
Figure 15B:
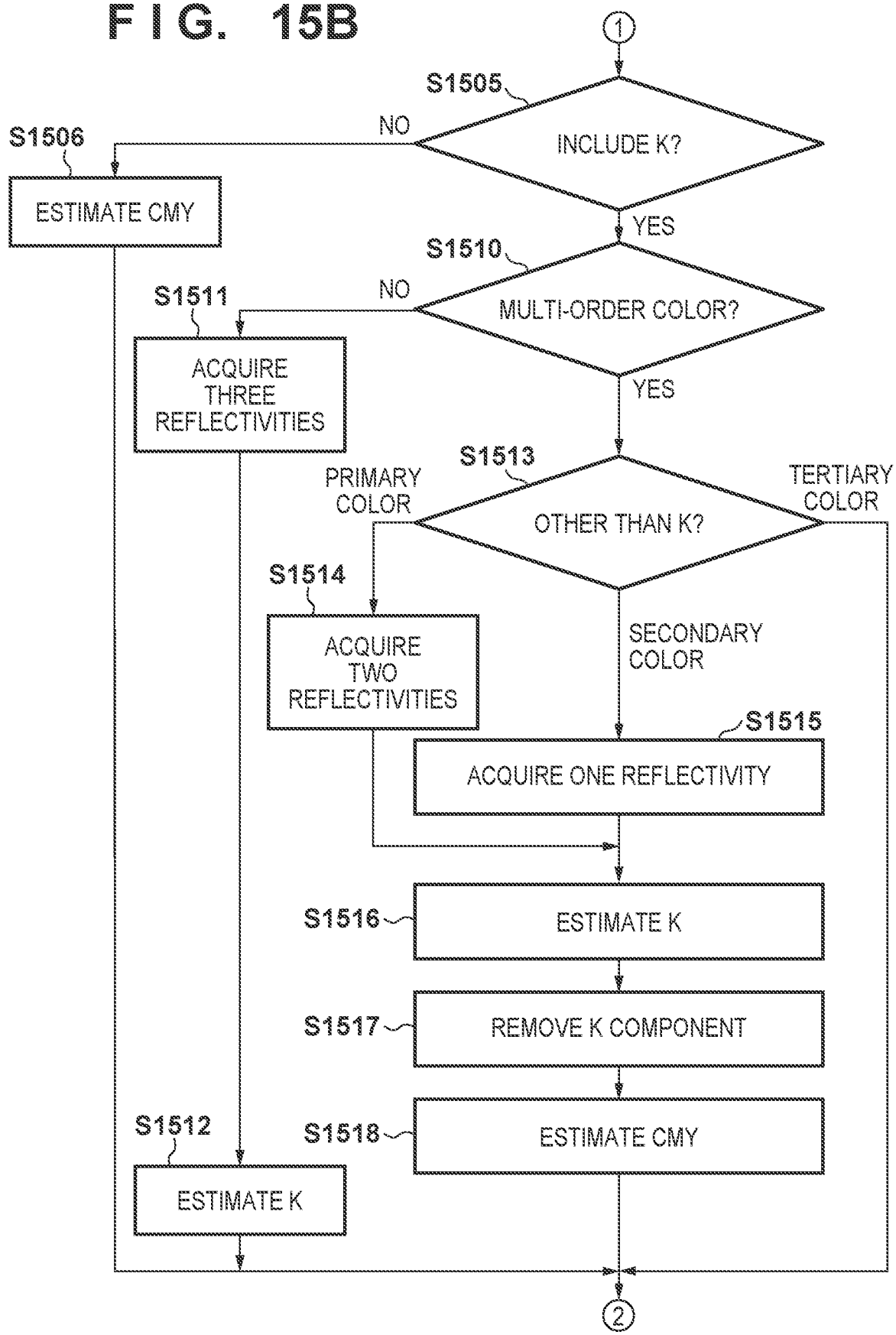

FIGS. 15A and 15B are flowcharts of the correction processing according to the second embodiment. In step S1501, via the console unit 103, the user enters a print job to the image forming apparatus.

In step S1502, the image processing unit 106, on the basis of the acquire print job, forms the image via the image forming unit 107 and reads the formed image via the image acquisition unit 108. Note that in the present embodiment, the RGB value of each image position (x, y) is acquired.

In step S1503, the color conversion processing unit 1401 converts the RGB value of each pixel to the reflectivity ($\rho\_c0$, $\rho\_m0$, $\rho\_y0$) of the CMY ink. Specifically, the virtual ink densities Vc, Vm, Vy are estimated using the conversion matrix Y. Also, in a similar manner to step S607 described above, the relationship (curved line 1101 in FIG. 11A) between the reflectivity of the inks held in advance and the densities of the virtual inks corresponding to the inks is acquired. The reflectivity ($\rho\_c0$, $\rho\_m0$, $\rho\_y0$) of the CMY ink is calculated from the relationship. Here, out_p may be calculated from in_d in accordance with the arrow indicated in FIG. 11A.

In step S1504, the estimation processing selection unit 404 selects the target region for the image data. For example, a square region centered at pixel position xi, yi is selected as the target region. In step S1505, the estimation processing selection unit 404 references the image data (CMYK) and determines whether or not the K ink is included in the target region. In a case in which the K ink is not included in the target region, the process proceeds to step S1506. In a case in which the K ink is included in the target region, the process proceeds to step S1510.

In step S1506, the CMY ink estimation processing unit 1403 estimates the reflectivity of the CMY ink. In the present embodiment, the obtained reflectivity ($\rho\_c0$, $\rho\_m0$, $\rho\_y0$) of the CMY ink is used as is as the reflectivity of the ink. In other words, the reflectivity of the C ink is set to $\rho\_c0$, the reflectivity of the M ink is set to $\rho\_m0$, and the reflectivity of the Y ink is set to $\rho\_y0$, and the estimation processing of the selected region ends. Note that a function or a table associating the relationship between the directional reflectivity and the reflectivity in a representative wavelength of each ink may be held, and the reflectivity of each ink obtained via conversion to the reflectivity in the representative wavelength for each ink on the basis of the function may be acquired.

In step S1507, the estimation processing selection unit 404 determines whether or not the estimation processing has been completed for all regions. In a case in which the estimation processing has not been completed, the process returns to step S1504 and a new region is selected as the target region, and the estimation processing is performed for this region. In a case in which the estimation processing has been completed for all regions, the process proceeds to step S1508.

In step S1508, the correction processing unit 402 (in a similar manner to step S608) performs deduction of the ink characteristic of each nozzle or module and correction of the correction table on the basis of the characteristic.

In step S1509, the CPU 100 determines whether or not all outputs specified by the job have been completed. In a case in which all outputs have been completed, user image printing processing ends. On the other hand, in a case in which all outputs have not been completed, the process returns to step S1502 and output of the user image continues.

In step S1510, the estimation processing selection unit 404 references the image data (CMYK) and determines whether or not the target region is formed in multi-color, in other words with a mixture of a plurality of inks. In a case in which it is formed in multi-color, the process proceeds to step S1513. In a case in which it is not formed in multi-color, the process proceeds to step S1511. Note that the process only proceeds to step S1511 when K ink included in step S1505 and it is determined that it is not multi-color in step S1510 (in other words, only when the target region is formed of a single color K).

In step S1511, the K ink estimation processing unit 1402 acquires three reflectivities ($\rho\_c0$, $\rho\_m0$, $\rho\_y0$) of the CMY ink acquired in step S1503. In step S1512, the K ink estimation processing unit 1402 estimates the reflectivity of the K ink from the reflectivities ($\rho\_c0$, $\rho\_m0$, $\rho\_y0$) of the CMY inks. In the present embodiment, the average value of $\rho\_c0$, $\rho\_m0$, $\rho\_y0$ is used as the reflectivity of the K ink. In other words, the K ink estimation processing unit 1402 calculates the reflectivity $\rho\_k$ of the K ink via $\rho\_k=(\rho\_c0+\rho\_m0+\rho\_y0)/3$.

In step S1513, the estimation processing selection unit 404 performs determination using the number of mixed inks other than the K ink. Specifically, in a case in which, other than K, one color of CMY is mixed, the process proceeds to step S1514. Also, in a case in which two colors of CMY are mixed, the process proceeds to step S1515. Furthermore, in a case in which three colors of CMY are mixed (in other words, a CMYK four color mixed region), the estimation processing is skipped, and the process proceeds to step S1507. This is because when the four values (reflectivity of CMYK) are estimated using the three outputs of the RGB sensor, in some cases the estimation value may not be stabilized from redundancy.

In step S1514, the estimation processing selection unit 404 acquires two reflectivities corresponding to the non-mixed ink as the reflectivity used in the estimation processing of the reflectivity $\rho\_k$ of the K ink. In other words, in a case in which the target region is a mixed region of the K ink and the C ink, the two reflectivities $\rho\_m0$ and $\rho\_y0$ are acquired.

In step S1516, the K ink estimation processing unit 1402 estimates the remaining reflectivity $\rho\_c0$ from the two reflectivities $\rho\_m0$ and $\rho\_y0$.

FIG. 16 is a diagram illustrating an example of a table indicating the relationship between the printing amount of the ink and the reflectivity. Specifically, the table indicates the reflectivities $\rho\_c$, $\rho\_m$, $\rho\_y$ of the CMY inks against the printing amount of the K ink. Such a table may be created and held in advance, and the remaining reflectivity may be estimated by referencing the table. In the example described above, the average value of $\rho\_cm$ obtained by referencing the table with $\rho\_m0$ as the key and $\rho\_cy$ obtained with $\rho\_y0$ as the key is taken as $\rho\_c0$ of the region. Also, from $\rho\_m0$, $\rho\_y0$, and $\rho\_c0$ obtained as such, the average value is calculated as the reflectivity $\rho\_k$ of the K ink.

Note that in creating the table indicated in FIG. 16, first, an image formed of a single color of the K ink and a uniform pattern is read by the RGB sensor of the image acquisition unit 108. Furthermore, the reflectivities $\rho\_c$, $\rho\_m$, $\rho\_y$ of the CMY inks obtained via conversion using the color conversion matrix Y described above may be associated together and stored.

In step S1515, the estimation processing selection unit 404 acquires the reflectivity corresponding to the non-mixed ink. Because the region is a three color mixed region including K, in a case in which the mixed region includes the K ink, the C ink, and the M ink, $\rho\_y0$ corresponding to the Y ink is acquired.

In step S1516, the K ink estimation processing unit 1402 estimates $\rho\_c0$ and $\rho\_m0$ from $\rho\_y0$ and the table indicating the reflectivity of the K ink indicated in FIG. 16. Thereafter, the average value of $\rho\_c0$, $\rho\_m0$, and $\rho\_y0$ is calculated as the reflectivity $\rho\_k$ of the K ink.

In step S1517, the K ink estimation processing unit 1402 performs processing to remove the effects of the reflectivity of the K ink on the reflectivities $\rho\_c0$, $\rho\_m0$, and $\rho\_y0$ of the CMY inks. Specifically, the effects are removed by dividing each reflectivity of the CMY ink obtained by the color conversion processing of the output values of the RGB sensor by the reflectivity used in calculating the average value in the estimation processing of the K ink. Furthermore, the post-removal reflectivity is sent to the CMY ink estimation processing unit 1403.

For example, the reflectivity of the C ink of the target region obtained via the conversion processing in step S1503 is $\rho\_c0$. Furthermore, when the reflectivity of the C ink used in calculating the average value in the estimation processing of the K ink is $\rho\_ck$, the reflectivity $\rho\_c$ of the C ink sent to the CMY ink estimation processing unit 1403 is calculated via $\rho\_c=\rho\_c/\rho\_k$.

In step S1518, the CMY ink estimation processing unit 1403 performs the estimation processing of the CMY ink. The processing is similar to that performed in step S1506, and thus description thereof is omitted.

In this manner, by performing the process following steps S1501 to S1518 described above, the user image is printed and color stabilization based on the read value obtained by the RGB sensor reading the printed image is performed. Also, here, even in the region including the K ink, the reflectivity ($\rho\_c$, $\rho\_m$, $\rho\_y$, $\rho\_k$) of each ink can be calculated taking into account the effects of the K ink.

Note that in step S1503, the process up until the calculation of the virtual ink density may be performed without calculating the reflectivity. In this case, the target characteristic for correction is set as the virtual ink density. In other words, for the process, the vertical axis in FIG. 13 is the virtual ink density and not the reflectivity. Also, the color space for forming the correction table in step S1508 may be performing using the virtual ink density. In other words, the vertical axis in FIG. 12D may be the virtual ink density.

In the description above, it is assumed that the reflectivity of a region where a plurality of inks are mixed is decided by the product of the reflectivity of each ink, and the effects of one of the inks is removed by division using the reflectivity of the ink. However, in a case in which the process is performed on the basis of the virtual ink density, the color development of the mixed region can be calculated using the sum of the developed colors of the ink mixed in the region, and removal of one of the ink can be performed via subtraction.

According to the second embodiment as described above, depending on the combination of types of the ink in the selected region, different methods of estimating the change in density can be switched to and used. Specifically, depending on whether or not K is included, whether or not there is multi-color, and the type of ink other than K, the different methods can be selectively used. Accordingly, the region used in estimation can be enlarged while an increase in the processing time can be kept to a minimum.

Second Modified Example

In the description above, a common target characteristic is set with respect to the module or nozzle, i.e., the unit for correction. In other words, in the correction (step S608, step S1508) when the user printing occurs, a common target characteristic is used. However, different target characteristics for each module or nozzle can be set. Alternatively, the first reading result of the user image can be set as the target characteristic. For example, the ink characteristic of each module can be calculated from the reading result of the first image of each output image, and, for the following printing, correction can be performed using the ink characteristic as the target characteristic.

Also, in the description above, the correction processing unit 402 performs the correction processing on the input image data (CMYK). However, a similar effect can be obtained with a configuration in which the correction processing is performed on a threshold matrix with respect to the image data used at the HT processing unit 403.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-132948, filed Aug. 17, 2021, which is hereby incorporated by reference herein in its entirety.

What is claimed is:

1. An image processing apparatus comprising:
an image forming unit configured to form an image on a recording medium using a plurality of color materials on the basis of first image data showing an image; and
an estimating unit configured to estimate a characteristic of each one of the plurality of color materials in a target region on the formed image on the basis of second image data obtained by reading the formed image,
wherein the estimating unit selects an estimation processing unit to use from among a plurality of estimation processing units used for different estimation methods on the basis of a combination of the color materials in the target region.

2. The image processing apparatus according to claim 1, wherein the second image data is obtained by reading the formed image by a spectroscopic sensor configured to acquire spectroscopic information of the image.

3. The image processing apparatus according to claim 1, wherein the second image data is obtained by reading the formed image by an RGB sensor configured to acquire RGB signals of the image.

4. The image processing apparatus according to claim 1, wherein the plurality of estimation processing units include a first estimation processing unit configured to estimate a characteristic of each one of the plurality of color materials using a wavelength able to be exclusively estimated and a processing order, and
wherein the estimating unit selects the first estimation processing unit in a case in which the combination of the plurality of color materials in the target region is a combination including a selected wavelength able to be exclusively estimated.

5. The image processing apparatus according to claim 4, wherein when the spectral reflectance of each one of the plurality of color materials is divided by a plurality of wavelength bands, the estimating unit puts a color material with fewer wavelength bands with reflectivity corresponding to roughly 1.0 lower in the processing order.

6. The image processing apparatus according to claim 4, wherein the estimating unit selects the selected wavelength from a wavelength band with reflectivity corresponding to roughly 1.0 for each one of the plurality of color materials.

7. The image processing apparatus according to claim 4, wherein the estimating unit changes the processing order depending on the combination of the plurality of color materials in the target region.

8. The image processing apparatus according to claim 1, wherein, in a case in which the selected wavelength can be selected for all of the plurality of color materials included in the target region, the estimating unit determines that the combination of the plurality of color material in the target region is a combination including a selected wavelength able to be exclusively estimated.

9. The image processing apparatus according to claim 1, wherein the plurality of estimation processing units includes a second estimation processing unit configured to perform conversion processing to convert pixel values of an image shown by the second image data to values from which the combination of the plurality of color materials can be exclusively estimated and estimate a characteristic of each one of the plurality of color materials using the values obtained via the conversion processing.

10. The image processing apparatus according to claim 9, wherein the estimating unit selects the second estimation processing unit in a case in which the combination of the plurality of color materials in the target region is not a combination including a selected wavelength able to be exclusively estimated.

11. The image processing apparatus according to claim 9, wherein the conversion processing is a matrix operation using a conversion matrix.

12. The image processing apparatus according to claim 1, wherein the characteristic is any one of a reflectivity, a density, or a distance from paper white in Lab color space.

13. The image processing apparatus according to claim 1, wherein the plurality of estimation processing units include a black estimation processing unit configured to estimate a characteristic of black.

14. The image processing apparatus according to claim 13,
wherein the plurality of estimation processing units include a color estimation processing unit configured to estimate a characteristic of cyan, magenta, and yellow.

15. The image processing apparatus according to claim 14,
wherein, in a case in which black is included in the target region, the estimating unit performs black estimation via the black estimation processing unit, performs removal processing based on a result of the black estimation on pixel values of the target region, and performs color estimation via the color estimation processing unit on the basis of pixel values obtained from the removal processing.

16. The image processing apparatus according to claim 1, further comprising a correcting unit configured to perform correction processing of image data to be used in image formation by the image forming unit on the basis of a characteristic of each one of the plurality of color materials in the target region estimated by the estimating unit.

17. A control method for an image processing apparatus provided with an image forming unit and a reading unit, comprising:
forming an image on a recording medium using a plurality of color materials on the basis of first image data showing an image via the image forming unit;
reading the image formed in the forming via the reading unit;
specifying a target region on the formed image; and
estimating a characteristic of each one of the plurality of color materials in the target region on the basis of second image data obtained in the reading,
wherein, in the estimating, an estimation method to use is selected from among different estimation methods on the basis of a combination of the color materials in the target region.

18. A non-transitory computer-readable recording medium storing a program for causing a computer to execute a control method for an image processing apparatus provided with an image forming unit and a reading unit, comprising:
forming an image on a recording medium using a plurality of color materials on the basis of first image data showing an image via the image forming unit;
reading the image formed in the forming via the reading unit;
specifying a target region on the formed image; and
estimating a characteristic of each one of the plurality of color materials in the target region on the basis of second image data obtained in the reading,
wherein, in the estimating, an estimation method to use is selected from among different estimation methods on the basis of a combination of the color materials in the target region.

* * * * *